United States Patent
Ledgerwood et al.

(10) Patent No.: US 11,081,868 B2
(45) Date of Patent: Aug. 3, 2021

(54) ENCLOSURE ARRANGEMENTS; COMPONENTS; AND METHODS

(71) Applicant: Eaton Intelligent Power Limited, Dublin (IE)

(72) Inventors: Adam Douglas Ledgerwood, Syracuse, NY (US); Terry Lee Tuper, Baldwinsville, NY (US); Graig Edmund DeCarr, Cicero, NY (US); Mevzad Ljuca, Manlius, NY (US)

(73) Assignee: Eaton Intelligent Power Limited, Dublin (IE)

( * ) Notice: Subject to any disclaimer, the term of this patent is extended or adjusted under 35 U.S.C. 154(b) by 381 days.

(21) Appl. No.: 16/209,402

(22) Filed: Dec. 4, 2018

(65) Prior Publication Data

US 2019/0109444 A1    Apr. 11, 2019

Related U.S. Application Data

(63) Continuation of application No. 15/429,697, filed on Feb. 10, 2017, now Pat. No. 10,177,548.

(60) Provisional application No. 62/294,764, filed on Feb. 12, 2016.

(51) Int. Cl.
| | |
|---|---|
| *H02G 3/08* | (2006.01) |
| *H02G 3/14* | (2006.01) |
| *H02G 3/10* | (2006.01) |
| *H02B 1/46* | (2006.01) |
| *H02B 1/28* | (2006.01) |
| *H01H 9/04* | (2006.01) |

(52) U.S. Cl.
CPC .............. *H02G 3/088* (2013.01); *H02B 1/28* (2013.01); *H02B 1/46* (2013.01); *H02G 3/081* (2013.01); *H02G 3/10* (2013.01); *H02G 3/14* (2013.01); *H01H 9/042* (2013.01)

(58) Field of Classification Search
CPC .................................................... H01L 313/025
USPC ........................................................ 361/609
See application file for complete search history.

(56) References Cited

U.S. PATENT DOCUMENTS

| | | | | | |
|---|---|---|---|---|---|
| 1,828,522 | A | * | 10/1931 | Reginald ................ | H02B 11/04 361/609 |
| 1,890,514 | A | * | 12/1932 | Krips .................... | H02B 11/127 361/609 |
| 2,121,610 | A | * | 6/1938 | Rugg ....................... | H02B 1/00 361/609 |
| 2,128,149 | A | * | 8/1938 | Linde ................... | H02B 11/127 361/607 |

(Continued)

FOREIGN PATENT DOCUMENTS

| | | |
|---|---|---|
| CN | 104781155 A | 7/2015 |
| JP | 4070850 | 1/2008 |

OTHER PUBLICATIONS

International Search Report and Written Opinion for Application No. PCT/US2017/017479 dated May 19, 2017.

*Primary Examiner* — William H. Mayo, III
*Assistant Examiner* — Krystal Robinson
(74) *Attorney, Agent, or Firm* — Merchant & Gould P.C.

(57) ABSTRACT

Aspects and techniques of the present disclosure relate to enclosures, such as, electrical enclosures, for example, explosion-proof enclosures, and including advantageous features and methods usable with such enclosures. Disclosed features and techniques relate to: an enclosure fastening device; a visual indicator; an enclosure handling assist arrangement; a control handle; and a reset controller.

20 Claims, 18 Drawing Sheets

(56) References Cited

U.S. PATENT DOCUMENTS

| | | | | |
|---|---|---|---|---|
| 2,255,927 | A * | 9/1941 | Huber | H01H 3/08 200/50.06 |
| 2,795,739 | A * | 6/1957 | Wood | H02B 11/133 361/607 |
| 2,944,864 | A * | 7/1960 | Krivulka | E05B 65/46 312/332.1 |
| 3,005,064 | A * | 10/1961 | Baird | H02B 11/127 200/50.21 |
| 3,217,211 | A * | 11/1965 | Norden | H02G 5/08 361/608 |
| 3,252,611 | A * | 5/1966 | Weitzman | H01H 23/06 220/242 |
| 3,636,498 | A | 1/1972 | McQuarrie | |
| 3,654,584 | A | 4/1972 | Gillemot et al. | |
| 3,663,773 | A * | 5/1972 | Powell | H02B 11/133 200/50.24 |
| 3,708,641 | A * | 1/1973 | Rubinstein | H02B 1/48 200/293 |
| 3,714,406 | A * | 1/1973 | Clarke | H02G 3/088 362/632 |
| 3,896,353 | A * | 7/1975 | Burton | H02B 11/133 361/609 |
| 4,355,269 | A * | 10/1982 | Burton | H02K 15/125 318/436 |
| 4,447,682 | A * | 5/1984 | Castonguay | H02B 11/24 200/50.22 |
| 4,489,362 | A * | 12/1984 | Castonguay | H02B 11/26 200/50.24 |
| 4,654,493 | A * | 3/1987 | Drager | G04C 23/04 200/302.1 |
| 4,724,512 | A * | 2/1988 | Bischof | H01H 9/26 200/50.06 |
| D311,723 | S | 10/1990 | Eggleston et al. | |
| 4,965,414 | A | 10/1990 | Sobotka, Jr. et al. | |
| 4,990,722 | A | 2/1991 | Benito Navazo | |
| 5,703,279 | A * | 12/1997 | Igura | H01R 13/5219 73/40 |
| 5,911,318 | A * | 6/1999 | Miyazaki | H01H 23/164 200/556 |
| 5,914,460 | A * | 6/1999 | Mowery | H02G 3/10 174/50 |
| 6,486,758 | B1 * | 11/2002 | Olszewski | H01H 71/1054 335/157 |
| 6,564,617 | B1 * | 5/2003 | Araki | G01M 3/02 73/40 |
| 6,864,443 | B1 * | 3/2005 | Bruchmann | H01H 19/635 200/43.11 |
| 6,878,891 | B1 * | 4/2005 | Josten | H02B 13/025 200/293 |
| 7,186,937 | B1 * | 3/2007 | Ricciuti | H01H 3/3005 200/400 |
| 7,431,611 | B2 | 10/2008 | King, Jr. et al. | |
| 7,688,572 | B2 * | 3/2010 | Yee | H01H 19/00 361/614 |
| 8,403,277 | B2 | 3/2013 | Nuernberger et al. | |
| 8,602,245 | B2 | 12/2013 | Manahan | |
| 8,777,535 | B2 | 7/2014 | Manahan | |
| 8,780,534 | B2 * | 7/2014 | Gibbons | H02B 11/127 361/643 |
| 8,844,749 | B2 | 9/2014 | Manahan et al. | |
| 9,221,587 | B2 | 12/2015 | Manahan | |
| 9,453,592 | B2 | 9/2016 | Zhang et al. | |
| 9,530,578 | B2 * | 12/2016 | Chen | H01H 33/42 |
| 10,692,665 | B2 * | 6/2020 | Yee | H02B 11/24 |
| 2003/0019651 | A1 * | 1/2003 | Kasai | H02G 3/088 174/66 |
| 2009/0046415 | A1 * | 2/2009 | Rasmussen | H02J 9/06 361/644 |
| 2009/0295532 | A1 * | 12/2009 | Puhalla | H01H 71/0207 337/102 |
| 2010/0258331 | A1 | 10/2010 | Dahlgren et al. | |
| 2012/0229958 | A1 * | 9/2012 | Hughes | H01H 71/0264 361/673 |
| 2013/0240220 | A1 | 9/2013 | Loureiro et al. | |
| 2014/0076901 | A1 | 3/2014 | Manahan et al. | |
| 2014/0091583 | A1 | 4/2014 | Manahan | |
| 2017/0237245 | A1 * | 8/2017 | Ledgerwood | H02G 3/10 220/3.8 |

* cited by examiner

ENCLOSURE ARRANGEMENTS; COMPONENTS; AND METHODS

CROSS REFERENCE TO RELATED APPLICATIONS

This application is a continuation of U.S. patent application Ser. No. 15/429,697, filed Feb. 10, 2017, which claims the benefit of U.S. Provisional Patent Application No. 62/294,764, filed Feb. 12, 2016, which applications are hereby incorporated by reference in their entireties.

TECHNICAL FIELD

The present disclosure relates generally to enclosures, and more particularly to advantageous features and methods usable with a variety of enclosures. The features and techniques are particularly well adapted for use with electrical enclosures, for example, explosion-proof enclosures.

BACKGROUND

A variety of enclosure types are known. Many are configured for containing active electrical and electronic equipment, for example, which is used in hazardous environments. When intended for this purpose many are explosion-proof.

Typically, an issue with hazardous environments is that a spark or flame could ignite flammable gasses or other constituents in the operating environment. Explosion-proof housings are designed and constructed to meet industry standards such as the explosion-proof standards contained in the National Electrical Code (NEC). Explosion-proof enclosures, such as a cast box, generally comprise a first housing portion which contains the active electrical and electronic instrument or device, and a second housing portion attached to the first housing portion to fully enclose the device. The first and second housing portions are secured to provide containment to any internal flammable events that originate inside the enclosure.

An explosion-proof enclosure is configured to allow gases from inside the enclosure to escape across joints of the enclosure and cool as the gases exit the explosion-proof enclosure. The joints are also known as flame paths and exist where two surfaces meet and provide a path from inside the explosion-proof enclosure to outside the explosion-proof enclosure, along which one or more gases may travel. A joint may be a mating of any two or more surfaces.

A few notable issues with conventional explosion-proof enclosures include the following: (1) first and second housing portions of an explosion-proof enclosure are often secured to one another with bolts; which can be less convenient for obtaining access; (2) explosion-proof enclosures contain complex components for operating electrical devices housed therein making the cost of manufacturing higher; (3) explosion-proof enclosures can be large and heavy to move safely or hard to open once mounted in place; and (4) explosion-proof enclosures may be exposed to corrosive conditions such that after a period of time it may be difficult to open the explosion-proof enclosures leading to forced, unsafe, openings.

Improvements in enclosures are desirable. The improvements characterized herein are particularly well adapted for explosion-proof enclosures, but are applicable with other types of enclosures.

SUMMARY

One aspect of the present disclosure relates to an enclosure arrangement including an enclosure that has a cover and a body. The cover can include a cover perimeter flange and the body can include a body perimeter flange that engages along a joint when in a closed relationship. A clamp arrangement can be configured to secure the cover perimeter flange and the body perimeter flange together. The clamp arrangement can include at least a first clamp member including a jaw flange. The first clamp member can be moveable between an engaged position and a retracted position. The first clamp member, when in the engaged position, can be mounted on a first one of the cover and body with the jaw flange extending over a portion of a second one of the cover and body at a location opposite the joint between the cover perimeter flange and the body perimeter flange to apply closing pressure. The first clamp member, when in the retracted position, can remain secured to the first one of the cover and body in a manner that does not prevent the cover from opening relative to the body. These features and techniques are well adapted for explosion-proof enclosures, but can be used with other types of enclosures.

Another aspect of the present disclosure relates to an enclosure arrangement including an enclosure having a cover and a body. The cover can have a cover perimeter flange and the body can have a body perimeter flange. The enclosure arrangement can include a control handle mounted thereon moveable between a first rotational position and a second rotational position. The enclosure arrangement includes a closure arrangement useable to selectively secure the enclosure closed. The enclosure arrangement can further include a visual indicator mounted on the control handle such that when the control handle is in the first rotational position the visual indicator prohibits access to the closure arrangement, and when the control handle is in the second rotational position the visual indicator facilitates opening access to the closure arrangement. These features and techniques are well adapted for explosion-proof enclosures, but can be used with other types of enclosures.

A further aspect of the present disclosure relates to an enclosure arrangement including an enclosure having a cover and a body. The cover can have a cover perimeter flange and the body can have a body perimeter flange. The cover and body being openable along a joint between the cover perimeter flange and the body perimeter flange. The enclosure can include an enclosure handling assist arrangement having a hanging closure-assist orientation and an opening-assist orientation. The enclosure handling assist arrangement can include at least one hanger and fastening arrangement including: a first hanger member; and a removable attachment arrangement including a first removable attachment member can be positioned in the cover perimeter flange; and a second removable attachment member can be positioned in the body perimeter flange. The first and second attachment members can be positioned adjacent, and spaced from one another across the joint between the cover and body perimeter flanges. When in the hanging, closure-assist, orientation, the at least one hanger and fastening arrangement can be configured with the first hanger member secured across the joint by the first and second removable attachment members; and when in the opening-assist orientation, the first hanger member having been removed from attachment to the enclosure, the first removable attachment member can be replaced in the cover perimeter flange and the second removable attachment member can be replaced in the body perimeter flange. These features and techniques are well adapted for explosion-proof enclosures, but can be used with other types of enclosures.

In a still further aspect, the present disclosure relates to an enclosure arrangement including an enclosure having a cover and a body. The body defining a cavity and an electrical component mounted within the cavity of the body. The electrical component can have a rotating switch device configured to move about a first arc of rotational motion between a first operating configuration and a second operating configuration. The first operating configuration can be a power-on configuration and the second operating configuration can be a power-off configuration. A control handle can be mounted externally to the body of the enclosure. The control handle can be configured to move about a second arc of rotational motion between a first rotational position and a second rotational position. The first rotational position can be an on-position that causes the rotating switch device to be in the power-on configuration, and the second rotational position can be an off-position that causes the rotating switch device to be in the power-off configuration. These features and techniques are well adapted for explosion-proof enclosures, but can be used with other types of enclosures.

A further aspect of the invention relates to an enclosure arrangement including an enclosure having a cover and a body defining a cavity. An electrical component can be mounted within the cavity of the body. The electrical component can have a non-toggle, linearly actuated, reset button configured to move linearly between a reset configuration and a non-reset configuration. A rotationally operated reset actuator arrangement can be mounted externally to the body of the enclosure. The rotationally operated reset actuator arrangement can be configured, upon actuation, to move about an arc of rotational motion between a first rotational position and a second rotational position. The first rotational position causing the non-toggle, linearly actuated, reset button to be in the reset configuration, and the second rotational position causing the non-toggle, linearly actuated, reset button to be in the non-reset configuration. A rotation-to-linear motion mechanical link arrangement can also be positioned within the cavity of the body adjacent the electrical component. The rotation-to-linear motion mechanical link arrangement can be arranged and configured to transfer rotational motion from the rotationally operated reset actuator arrangement to linear motion of the non-toggle, linearly actuated, reset button. These features and techniques are well adapted for explosion-proof enclosures, but can be used with other types of enclosures.

The various aspects characterized above in this section can be used together or separately in enclosure arrangements.

DETAILED DESCRIPTION

Figure 1:
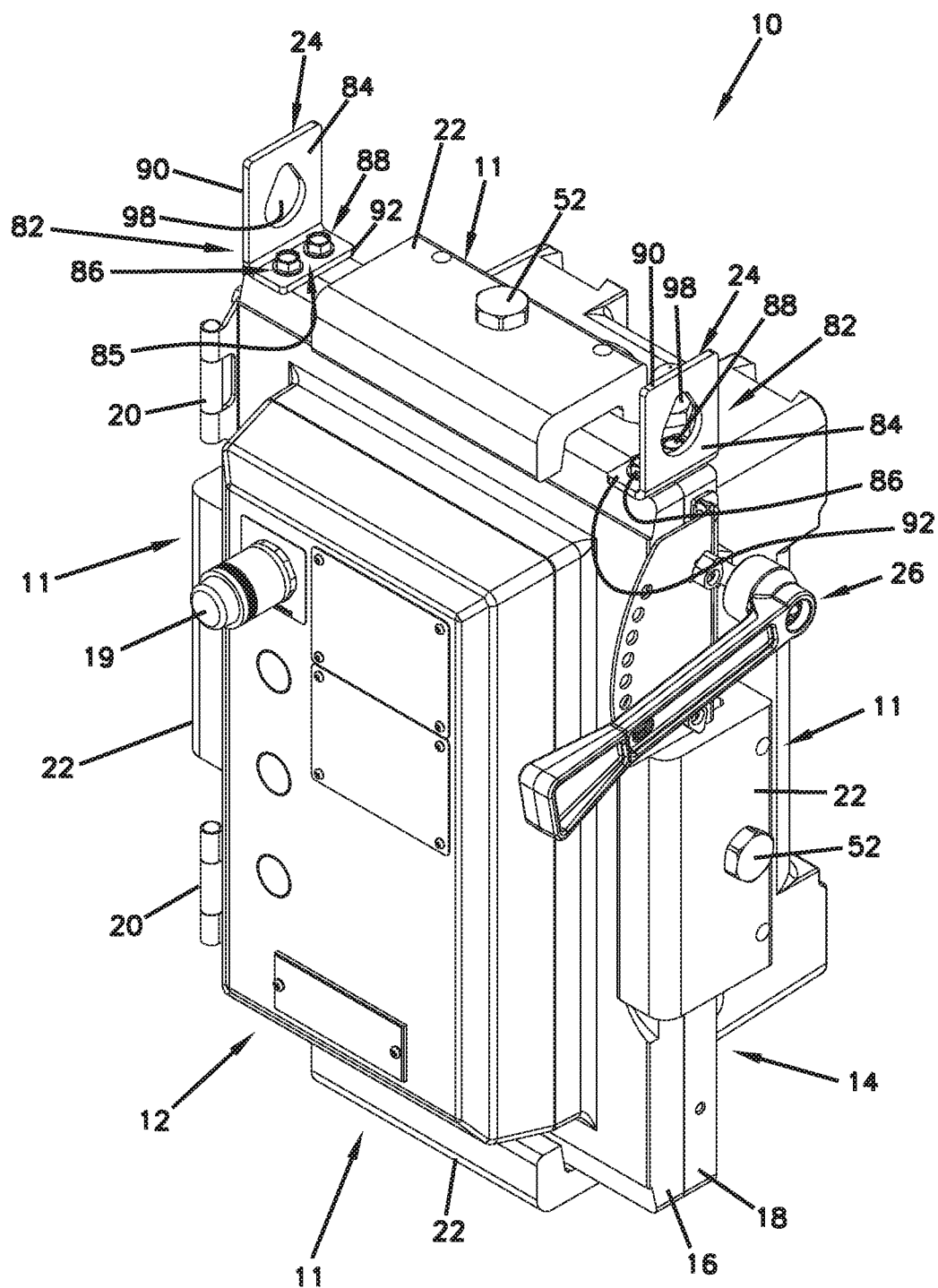
FIG. 1 is a schematic perspective view of a first example enclosure including features of a handling assist arrangement and a clamp arrangement in accord with selected principles of the present disclosure.

I. General Features of An Example Enclosure; FIGS. 1-4

FIGS. 1-4 depict various schematic views of an example enclosure including features according to the present disclosure. The example enclosure depicted is an electrical equipment enclosure. The example depicted is specifically an explosion-proof enclosure 10. While the examples discussed herein are with reference to explosion-proof enclosures 10, other types of non-explosion-proof enclosures (e.g., junction boxes, control panels, lighting panels, motor control centers, switchgear cabinets, relay cabinets) or any other type of enclosure (e.g., a flame-proof enclosure) may be used.

The explosion-proof enclosure 10 includes a cover section or cover 12 and a body section or body 14. The explosion-proof enclosure 10 can be used to house active electrical components, such as, circuit breakers, motor starters, switches, relays, terminals and meters, for example. The term, "active", in this context, means that the electrical components are electronically operating within the explosion-proof enclosure 10. The explosion-proof enclosure 10 can include one or more control knobs 19 (e.g., indicator lights, switches) for controlling various features of the equipment housed therein. Plugs 21 of various sizes can be configured on the explosion-proof enclosure 10 for receiving wiring of electrical components or for plugging holes in the explosion-proof enclosure 10 that are not being used.

The explosion-proof enclosure 10 may also include reducers 23 that are threaded on the inside and outside for reducing thread sizes on electrical systems that have smaller conduits. Breathers and/or drains 25 can optionally be mounted on the explosion-proof enclosures 10 to let products breath and/or to let condensation/water out of the enclosure 10 to maintain the explosion-proof system.

The cover 12 and body 14 can be fabricated of a material, e.g., steel, cast iron, and the like, that can be mated together to form a joint therebetween or a flame path. The flame path of the explosion-proof enclosure 10 is capable of preventing a spark or flame that is originated within the explosion-proof enclosure 10 from escaping into a hazardous environment. The enclosure helps to prevent an explosion or fire where flammable gases or materials may exist.

The explosion-proof enclosure 10 includes a cover perimeter flange 16 and a body perimeter flange 18. The cover perimeter flange 16 is mated with the body perimeter flange 18 when the explosion-proof enclosure 10 is in a closed position. An optional sealing element, such as an O-ring, can be disposed in a groove adjacent to the cover perimeter flange 16 for providing an air- and water-tight seal between the cover 12 and body 14 when attached. This helps insure that should an explosion take place within the explosion-proof enclosure 10 it will more likely be confined to the space within the explosion-proof enclosure 10. Thus, no flame will pass to the outside of the explosion-proof enclosure 10 to ignite an explosive atmosphere externally of the explosion-proof enclosure 10.

One or more hinges 20 may be positioned along a side of the cover 12 and a corresponding side of the body 14, although alternatives are possible. This example depicted shows two hinges 20 that are shown positioned on a side of the cover 12 and body 14. It will be appreciated that there may be no hinges 20 coupling the cover 12 to the body 14.

In order for an explosion-proof enclosure 10 to meet certain standards and requirements, the cover 12 must be secured to the body 14 within certain, tolerances. Typically, the cover 12 is secured to the body 14 using numerous of bolts. Often times, this requires 30 or more bolts to be tightened around the explosion-proof enclosure 10 to secure the cover 12 to the body 14. As such, coupling and uncoupling all of the bolts is generally time-consuming and tedious when trying to secure or remove the cover 12 to the body 14. It is preferred to use an alternate method to bolts for securing the cover 12 to the body 14 that more easily allows a user to remove or attach the cover 12 from the body 14. In accord with principles described in the present disclosure, a clamp arrangement 11 is provided for securing the cover 12 to the body 14 of the explosion-proof enclosure 10.

The clamp arrangement 11 includes at least one clamp device 22. The clamp device 22 can provide a sufficient force to create a gap, or flame path, between the cover 12 and the body 14 to allow the system to withstand an explosion. In the depicted example, the explosion-proof enclosure 10 includes a number of clamps or clamp devices 22 that provide for the clamp arrangement 11 arranged around the perimeter of the cover and body perimeter flanges 16, 18. In the depicted example, a total of four example clamp devices 22 are shown. Clamp devices 22 are used to keep the cover 12 and body 14 closed under circumstances of an internal explosion.

When all of the clamp devices 22 are removed, the cover 12 may swing outward (i.e., an open position) from the body 14 about the hinges 20. In certain examples where there are no hinges 20, the cover 12 can be separated from the body 14 when all of the clamp devices 22 are removed. The clamp devices 22 is illustrated and described in more detail with reference to FIGS. 5-7.

The handling of explosion-proof enclosures can present a variety of issues. A first issue is that the explosion-proof enclosures are heavy (on the order of about 250-300 lbs; e.g., about 113-136 kg) and sometimes need to be moved to operable locations. Typically, moving the explosion-proof enclosures requires some means of attaching the explosion-proof enclosure to a crane or other type of assist.

A second issue is that the explosion-proof enclosure is typically located in a corrosive environment for a long period of time. As such, there can be a long period of time in a corrosive environment between times in the explosion-proof enclosure is opened. Accordingly, it can be hard to open the explosion-proof enclosure after time. A handling assist arrangement has been developed to address both issues.

In accord with principles described, the explosion-proof enclosure 10 includes an advantageous, enclosure handling assist arrangement 24 to assist in moving the explosion-proof enclosure 10 to a location. The enclosure handling assist arrangement 24 can be used to safely lift the explosion-proof enclosure 10 when closed. The lifting arrangements 24 may also be used for mounting the explosion-proof enclosure 10 to an external surface or supporting structure (e.g., wall, beam, column, and so forth) vertically.

In accord with principles described, the enclosure handling assist arrangement 24 may also be used to safely open the explosion-proof enclosure 10. As depicted, the enclosure handling assist arrangement 24 is shown mechanically coupled to the explosion-proof enclosure 10, although alternatives are possible. The enclosure handling assist arrangement 24 can be mounted to the explosion-proof enclosure 10 using one or more methods, including, but not limited to fastening devices and mating threads. The enclosure handling assist arrangement 24 is illustrated and described in more detail below with reference to FIGS. 1, 2 and 11.

Often, it is necessary to actuate a breaker or reset a motor starter positioned within a body of the explosion-proof enclosure without opening a cover of the explosion-proof enclosure. Thus, operating handles or mechanisms are provided on an exterior of the explosion-proof enclosure. Certain example conventional explosion-proof enclosures use operating mechanisms on the cover of the explosion-proof enclosure to operate an electrical component, such as, the circuit breaker or motor starter. Such a design can present problems with aligning the operating mechanisms with the circuit breaker handle or motor starter, while the cover is in a closed position. Also, the operating mechanisms may not be standardized to work with various components (breakers, disconnects, different brands, etc.) of different types and sizes.

It is desirable to provide an operating mechanism for checking proper operation of circuit breakers, motor starters, etc. while the cover is in the open position.

The example explosion-proof enclosure 10 includes a control handle 26 mounted to a side of the explosion-proof enclosure 10. The control handle 26 has an operating system that is only contained within the body 14 of the explosion-proof enclosure 10. As such, the system can be checked to ensure proper operation of electrical components housed within the explosion-proof enclosure 10 while the cover 12 is opened. Furthermore, the location of the control handle 26 allows it to work with a variety of components of different types and sizes (breakers, disconnects, different brands, etc.). The control handle 26 is illustrated and described in more detail with reference to FIGS. 5 and 8.

It is often necessary to reset a motor starter without opening a cover of an explosion-proof enclosure. As such, operating handles or mechanism are provided on an exterior of the explosion-proof enclosure. Typically, a bail type mechanism is aligned for actuating a toggle-type reset button on the motor starter internally. However, bail type mechanisms are not an appropriate mechanism for operating various types of non-toggle reset buttons.

It is desirable to have a reset handle that can be accessed from outside the explosion-proof enclosure and connect inside of the explosion-proof enclosure 10 to properly operate a linearly, actuated, reset button of an electrical component (e.g., motor starter) housed within the body 14 of the explosion-proof enclosure.

In certain examples, the control handle 26 and the reset handle 28 are mounted on the same side of the explosion-proof enclosure 10. In other examples, the control handle 26 and the reset handle 28 are mounted on opposite sides of the explosion-proof enclosure 10. In still other examples, the enclosure-proof enclosure 10 may not include a reset handle 28. The reset handle 28 is illustrated and described in more detail with reference to FIGS. 11-13.

There is no specific requirement that an explosion-proof enclosure, component therefor, or feature thereof include all of the specific features and/or variations characterized herein, to obtain some advantage according to the present disclosure.

II. Enclosure Clamp Arrangement for Securing An Example Enclosure; FIGS. 1-7

Explosion-proof enclosures are used to contain electrical equipment in an atmosphere such that any flames or arcs are contained within the explosion-proof enclosure. The explosion-proof enclosures are secured in a manner to manage a flame path.

A typical way to secure the explosion-proof enclosure is by screws or bolts which fasten a cover onto a base of the explosion-proof enclosure. Often times, this requires 30 or more bolts to be tightened around the enclosures to secure the cover to the body and create a flame path. The number of bolts increases the inconvenience of the use of the explosion-proof enclosure, since the bolts need be installed and then removed to examine or work in the interior of the explosion-proof enclosure after installation.

Another way to seal the enclosure is by using a latch clamp of the types characterized in U.S. Pat. Nos. 8,777,535, 9,221,587, and 8,844,749. In certain of these, a bolt is required to lock the enclosure and a cam mechanism to remove the clamp. Although the latch clamp avoids the multiple bolts, it has complex components and a design that is difficult to manufacture, which increases cost.

An improved fastening device is desirable over the arrangements explained in U.S. Pat. Nos. 8,777,535, 9,221,587, and 8,844,749, for example. An improved fastening device is described below.

Referring to FIGS. 1-4, an example explosion-proof enclosure 10 is depicted including a cover section or cover 12 and a body section or body 14. The cover 12 includes a cover perimeter flange 16 positioned around a perimeter of the cover 12. The body 14 includes a body perimeter flange 18 positioned around a perimeter of the body 14. The cover perimeter flange 16 and the body perimeter flange 18 engage (i.e., abuts against, mated to) along a joint 94 when the cover 12 and body 14 are in a closed relationship. The cover perimeter flange 16 and the body perimeter flange 18 each have a height or thickness, which may be the same or different from each other.

The body 14 defines a chamber 34 (e.g., cavity) for receiving circuit breakers, motor starters, switches, relays, terminals and meters, for example. The explosion-proof enclosure 10 is shown "boltless" such that fastening devices, such as bolts or screws, are not used to directly mechanically couple the cover 12 to the body 14 as in certain example conventional securing mechanism. In the depicted example, the explosion-proof enclosure 10 includes a clamp arrangement 11 having a number of clamps or clamp devices 22 (e.g., clamp members) arranged around a perimeter of the cover 12 and body 14. In the depicted example, a total of four clamp devices 22 are shown, although alternatives are possible. The clamp arrangement 11 can be used to secure the cover perimeter flange 16 and the body perimeter flange 18 together.

The clamp devices 22 are capable of supplying a uniform force so as to provide an appropriate gap, or flame path, between the cover 12 and body 14 of the explosion-proof enclosure 10. The gap is configured to allow a flame to pass through, while the explosion-proof enclosure 10 is able to withstand any pressures associated with an internal explosion. In certain examples, the gap is about 0.0015 inches and the explosion-proof enclosure 10 can withstand a hydrostatic pressure of about 560 pounds per square inch (psi).

In certain examples, the explosion-proof enclosure 10 may include one or more hinges 20 for hingedly coupling the cover 12 to the body 14. The hinges 20 can be of any configuration, shape, and/or size. The hinges 20 allow the cover 12 to swing away from the body 14 along the hinges 20. Other devices, such as, but not limited to, one or more other claps systems, some other fastening feature, or any combination thereof, may be used to provide a hinge. The cover 12 can be rotated about the hinges 20 to an open position to allow access within the body 14. It will be appreciated that one having ordinary skill in the art will recognize that the hinges 20 can be positioned on any side of the explosion-proof enclosure arrangement 10.

It will be appreciated that there may be no hinges 20 coupling the cover 12 to the body 14 and the cover 12 can be removably mounted to the body 14. For example, once the clamp arrangement 11 is removed from the cover 12, the cover 12 can be completely separated or removed from the body 14.

The cover 12 and body 14 may be made of one or more of a number of suitable materials, including metal (e.g., alloy, stainless steel), plastic, some other material, or any combination thereof. The cover 12 and body 14 may be made of the same material or of different materials. It will be appreciated that the explosion-proof enclosure 10 may be manufactured in different sizes/cuts to fit or conform to any of various electrical components or devices.

Figure 5:
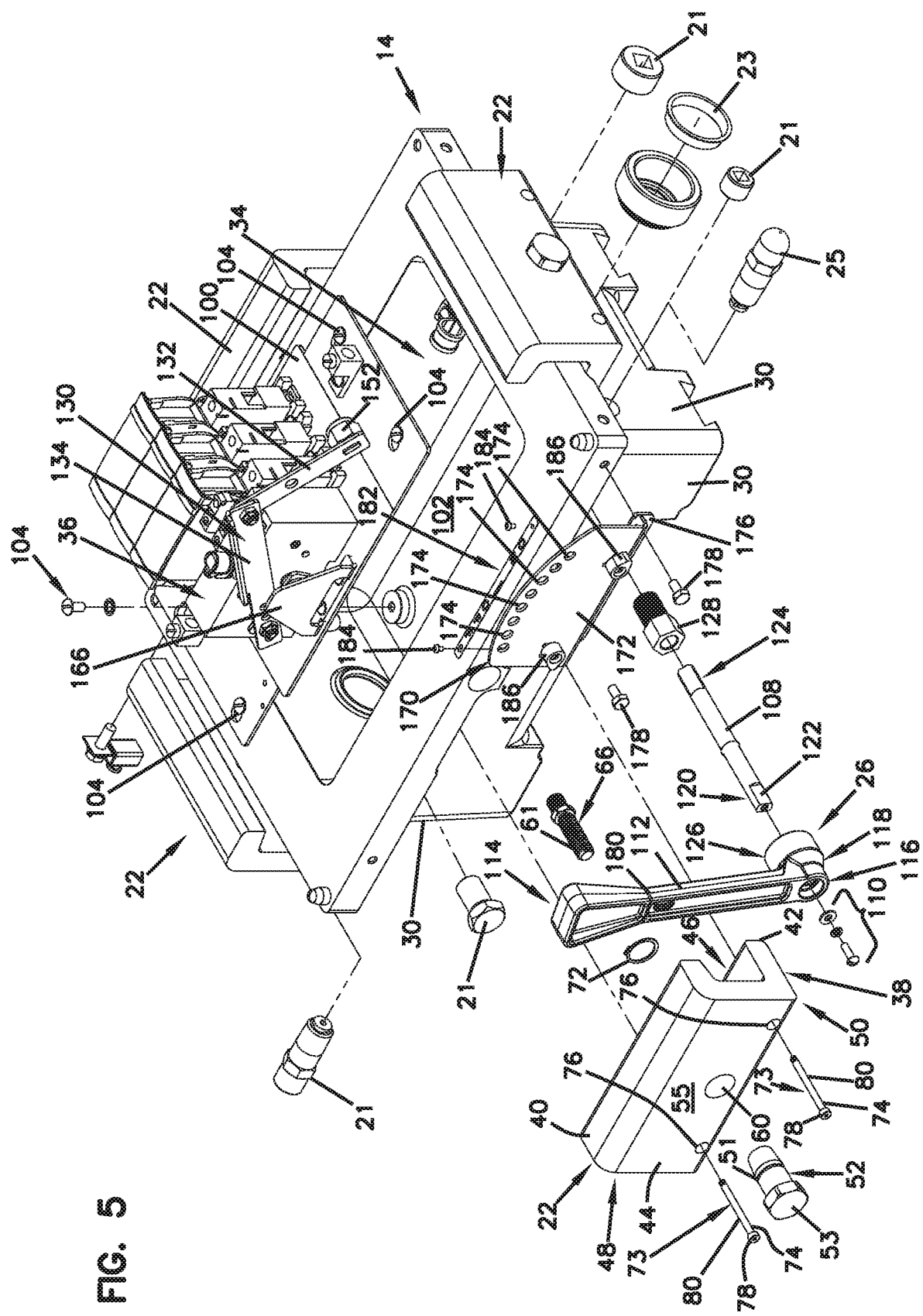
FIG. 5 is a schematic view of a body of the enclosure of FIG. 1 showing exploded views of an example clamp device of the clamp arrangement of FIG. 1, and a control handle of the enclosure in accord with the principles of the present disclosure.

Referring to FIG. 5, the clamp arrangement 11 includes at least one clamp device 22 including a jaw flange 17. An exploded view of one of the clamp devices 22 is depicted. The clamp device 22 is movable between an engaged position and a retracted position. The clamp device 22 may be made of one or more of a number of suitable materials, including metal (e.g., alloy, die cast aluminum, stainless steel, and/or extruded steels), some other material or any combination thereof.

The clamp device 22, when in the engaged position, is arranged and adapted to be mounted on a first one of the cover 12 and body 14 with the jaw flange 17 extending over a portion of a second one of the cover 12 and body 14 at a location opposite the joint 94 between the cover perimeter flange 16 and the body perimeter flange 18 to apply closing pressure. Alternatively, the jaw flange 17 may also extend over a portion of a second one of the cover 12 and body 14 at a location directly opposite the joint 94 between the cover and body perimeter flanges 16, 18. For example, the jaw flange 17 may overlap or extend across the joint 94. The clamp device 22, when in the retracted positioned, can remain secured to the first one of the cover 12 and body 14 in a manner that does not prevent the cover 12 from opening relative to the body 14.

The clamp device 22 can be an opposing jaw clamp member, alternative arrangements are possible. For example, the clamp device 22 can be a fixed jaw clamp member 38 that includes a first, cover engaging, jaw 40, an opposite second jaw 42, and a center portion 44 positioned between the first and second jaws 40, 42 that together define a channel 46. Herein by the term, "fixed jaw clamp member" and variants thereof, in this context, it is meant that the first, cover engaging, jaw 40 and the second jaw 42 do not move relative to one another, in use. That is, a bite of the fixed jaw clamp member 38 is neither opened nor closed during clamp operation.

The first, cover engaging, jaw 40 extends outwardly from an upper end 48 of the center portion 44 and the second jaw 42 extends outwardly from a lower end 50 of the center portion 44. The first, cover engaging, jaw 40, the second jaw 42, and the center portion 44 may be integrally formed as one single piece, although alternatives are possible.

Figure 7:
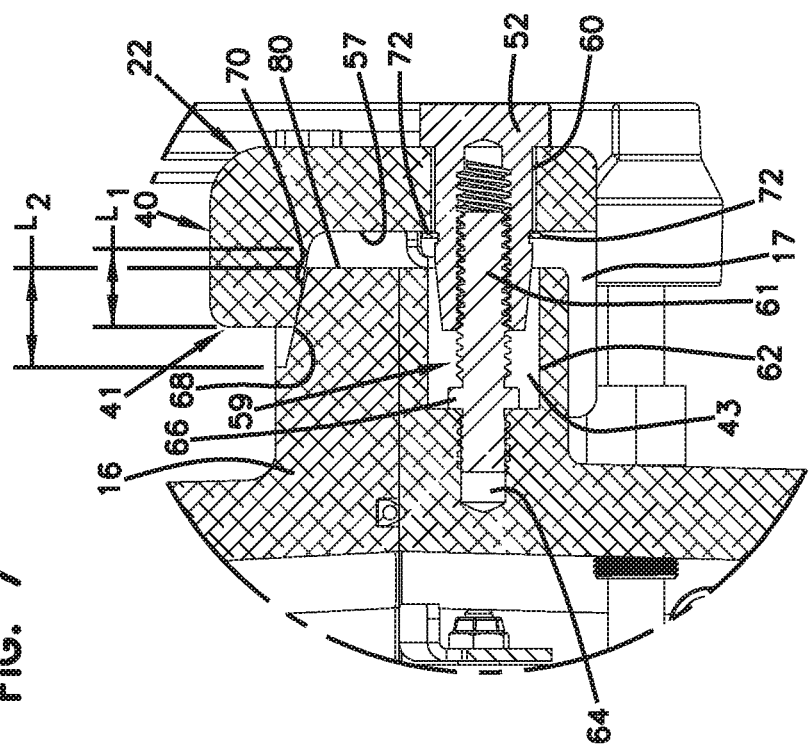
FIG. 7 is an enlarged schematic fragmentary cross-sectional view of a portion of the clamp device shown in FIG. 6.
Figure 6:
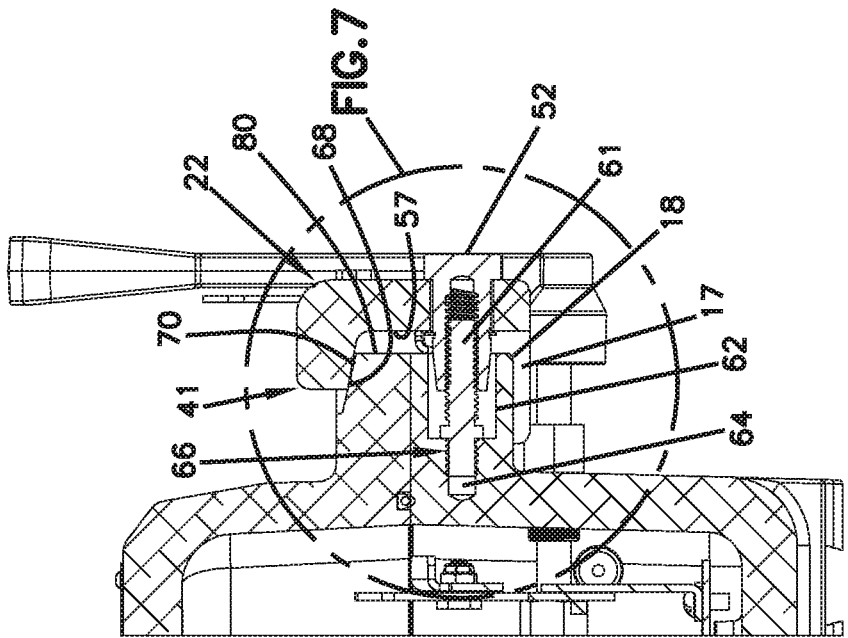
FIG. 6 is a schematic fragmentary cross-sectional view of the clamp device of the clamp arrangement shown in FIG. 5.

Referring to FIGS. 6-7, cross-sectional views of the clamp device 22 attached to the explosion-proof enclosure 10 are depicted. In one embodiment, the explosion-proof enclosure 10 includes a driver system 59 having a driver arrangement 52 (e.g., actuator, threaded connection, nut, handle, bolt, screw, mechanical fastener) and an actuator member 66 (e.g., nut, mechanical fastener, stud, linear member, shaft).

The driver arrangement 52 can be mounted on the clamp device 22 and configured to move the clamp device 22 between engaged and retracted positions. The driver arrangement 52 can be a rotatable driver arrangement configured, upon rotation, to linearly bias the clamp device 22 between engaged and retracted positions, although alternatives are possible.

As used herein, the term, "between" and variants thereof, in this context, means that the clamp device 22 may be moved in a direction from either one of the first recited position toward the second or the second recited position toward the first. Furthermore, in this context, the term "between" is not meant to necessarily indicate, unless specifically stated, that the motion is entirely between the two recited positions. Thus, the characterized motion can be along a path between the two recited positions, such that, the motion is from a direction of one position toward the other position or from a direction of the other position toward the one position.

In the depicted example, the driver arrangement 52 includes a bolt 51 with a bolt head 53 mounted adjacent an outer surface 55 of the clamp device 22, although alternatives are possible. The driver arrangement 52 may optionally include an interference member 72 (e.g., snap ring) positioned in engagement with the bolt 51 and adjacent an inner surface 57 of the clamp device 22. When the driver arrangement 52 is retracted, interference between the interference member and the inner surface of the clamp device 22 causes the clamp device 22 to move. The interference member 72 may be fabricated from any material suitable for high strength and wear resistance. Suitable materials include, but are not limited to, stainless steel.

The driver arrangement 52 is adapted to be received in an opening 60 defined in the center portion 44 of the fixed jaw clamp member 38. The driver arrangement 52 may be fabricated from any material suitable for high strength and wear resistance. Suitable materials include, but are not limited to, stainless steel. The driver arrangement 52 is rotatably coupled to the body perimeter flange 18 of the explosion-proof enclosure 10.

In certain examples, a mounting boss 62 can be integrally formed with the second jaw 42 of the fixed jaw clamp member 38. The mounting boss 62 can be shaped with a driver receiver 43 therein that receives the driver arrangement 52 when in the engaged position. The mounting boss 62 can also be a separate element from the second jaw 42.

In the depicted example, bosses 62 are provided at each side of the body 14 where clamp devices 22 are shown. It will be appreciated that although four bosses 62 are provided, the disclosure is not to be construed as being limited to four as the number of bosses 62 can be greater than or fewer than four. The bosses 62 serve two primary purposes. First, they provide structural support and reinforcement to the body 14. Second, the bosses 62 accommodate the clamp devices 22 and allow the body perimeter flange 18 to be thinner.

Each boss 62 can include a threaded opening 64 for receiving an actuator member 66. The actuator member 66 may be a fixed actuator stud, although alternatives are possible. For example, the actuator stud 66 may not be fixed.

The actuator member 66 may include a mechanical fastener such as, but not limited to, a thumbscrew, machine screw or bolt that can be coupled to the body 14 of the explosion-proof enclosure 10 or mounted to interface with the body 14 of the explosion-proof enclosure 10. The actuator member 66 includes a replaceable wear surface that allows it to be replaced once worn. The actuator member 66 may be fabricated from any material suitable for high strength and wear resistance. Suitable materials include, but are not limited to, stainless steel.

In the example depicted, the actuator member 66 includes a threaded extension 61 on which the driver arrangement 52 is rotatably mounted such that the driver arrangement 52 rotates along the actuator member 66 to move the clamp device 22 between the retracted and engaged positions, alternatives are possible. The movement of the clamp device 22 may be a linear motion. In other examples, the clamp device 22 may move non-linearly between the retracted and engaged positions.

The actuator member 66 may be a non-threaded nut, shaft, or other mechanical member. In such an example, the driver arrangement 52 is linearly mounted such that the driver arrangement 52 moves along the actuator member 66 to linearly move the clamp device 22 between the retracted and engaged positions.

The first, cover engaging, jaw 40 of the fixed jaw clamp member 38 has an edge 41 remote from the center portion 44 of the fixed jaw clamp member 38. The first, cover engaging, jaw 40 including a tapered flange engaging surface 70 that tapers away from the second jaw 42 in extension toward the edge 41 of the first, cover engaging, jaw 40. The first, cover engaging, jaw 40 can be configured to ride along and engage an associated tapered portion 68 of the cover perimeter flange 16 when the clamp device 22 is linearly moved from the retracted position to the engaged position.

The first, cover engaging, jaw 40 does not entirely cover the associated tapered portion 68 of the cover perimeter flange 16 when in the engaged position, alternatives are possible. For example, the first, cover engaging, jaw 40 can cover the entire associated tapered portion 68 of the cover perimeter flange 16 when in the engaged position.

The first, cover engaging, jaw 40 continues to move thereon until the associated tapered portion 68 of the cover perimeter flange 16 prevents the clamp device 22 from further linear motion. The first, cover engaging, jaw 40 and second jaw 42 of the fixed jaw clamp member 38 remain fixed relative to one another as the clamp device 22 is moved linearly between the engaged and retracted positions.

In one example, as the driver arrangement 52 is moved in a first direction (e.g., clockwise), the driver arrangement 52 linearly biases the clamp device 22 from the retracted position toward the engaged such that the channel 46 of the fixed jaw clamp member 38 receives the cover perimeter flange 16 and the body perimeter flange 18 of the explosion-proof enclosure 10 such that the cover 12 and the body 14 are in the closed relationship.

Conversely, as the rotatable driver arrangement 52 is rotated in an opposite second direction (e.g., counterclockwise), the rotatable driver arrangement 52 provides a pulling force to linearly remove the clamp device 22 from the engaged position toward the retracted position such that the first, cover engaging, jaw 40 is separated from the cover perimeter flange 16, but remains attached to the body perimeter flange 18.

The tapered flange engaging surface 70 of the first, cover engaging, jaw 40 can have an angle of at least 5 degrees, although variations are possible. Usually, the tapered flange engaging surface 70 of the first, cover engaging, jaw 40 has an angle of no more than 10 degrees, although variations are possible. Typically, the tapered flange engaging surface 70 of the first, cover engaging, jaw 40 has an angle within a range of 3 degrees to 8 degrees, inclusive.

The tapered flange engaging surface 70 of the first, cover engaging, jaw 40 has a first taper length $L_1$; the term, "first taper length" referring to a region that is tapered from the edge 41 of the first, cover engaging, jaw 40 remote from the center portion 44 toward the center portion 44.

The associated tapered portion 68 of the cover perimeter flange 16 has a second taper length $L_2$; the term, "second taper length" referring to a region that is tapered from tip 80 back toward the cover 12.

Variations of the length $L_1$ are possible. Often, the length $L_1$ of the tapered flange engaging surface 70 of the first, cover engaging, jaw 40 is at least 40% of a length $L_2$ of the associated tapered portion 68 of the cover perimeter flange 16. Usually, the length $L_1$ of the tapered flange engaging surface 70 of the first, cover engaging, jaw 40 is not more than at least 75% of the length $L_2$ of the associated tapered portion 68 of the cover perimeter flange 16. Typically, the length $L_1$ of the tapered flange engaging surface 70 of the first, cover engaging, jaw 40 is not more than 50% of the length $L_2$ of the associated tapered portion 68 of the cover perimeter flange 16. Alternative ratios of the length $L_1$ of the tapered flange engaging surface 70 of the first, cover engaging, jaw 40 relative to the length $L_2$ of the associated tapered portion 68 of the cover perimeter flange 16 are possible.

Turning again to FIGS. 4-5, the example explosion-proof enclosure 10 can include a guide system 71 including a guide arrangement 73 associated with the clamp device 22. The guide arrangement 73 can include guide members 74 (e.g., first and second guide members). Although two guide members 74 are depicted, any number of guide members 74 may be used. The guide members 74 are depicted as studs, although alternatives are possible, such as, but not limited to, a shaft.

The guide members 74 can be mounted on the body 14 of the explosion-proof enclosure 10 and upon which the clamp device 22 moves between the engaged and retracted positions. Each of the guide members 74 extend through guide channels 76 (e.g., slot channels) defined in the second jaw 42 of the fixed jaw clamp member 38 and can be mechanically attached the body 14 of the explosion-proof enclosure 10. In one example, the guide members 74 can be threadably mounted to the body 14, although alternatives are possible. In another example, the guide members 74 can be welded to the body 14, although alternatives are possible. In other examples, the guide members 74 can be adhesively secured to the body 14, although alternatives are possible.

The guide members 74 are respectively positioned on opposing sides of the opening 60 defined by the clamp device 22. The guide members 74 can each include an end retraction stop arrangement 78 that prevents the clamp device 22 from separating from the body 14 of the explosion-proof enclosure 10 when in the retracted position. In one example, the clamp device 22 is slideably mounted on the guide members 74 such that as the clamp device 22 moves along the guide members 74, toward and away from the joint 94, the clamp device 22 does not rotate, but stays in proper alignment with the body 14 of the explosion-proof enclosure 10. It will be appreciated that the clamp device 22 can also rotate as it moves along the guide members 74, toward and away from the joint 94, although alternatives are possible.

In certain examples, guide members 74 may be used to allow a user to easily clamp the cover 12 to the body 14 without having to manually hold the cover 12 against the body 14. For example, the guide members 74 allow the clamp devices 22 to be removed from the cover perimeter flange 16 and provide access within the body 14 of the explosion-proof enclosure 10 without having to separate the clamp devices 22 from the body perimeter flange 18. When the clamp devices 22 are separated from the cover perimeter flange 16, the cover 12 can pivot about the hinges 20 to allow access within the explosion-proof enclosure arrangement 10.

The present disclosure also relates to a method of operating the explosion-proof enclosure 10. The method can include the step of moving the clamp device 22 of the clamp arrangement 11 over a first one of the cover 12 and body 14 with the jaw flange 17 extending over a portion of a second one of the cover 12 and body 14 at a location opposite the joint 94 between the cover perimeter flange 16 and the body perimeter flange 18 to apply closing pressure when in the engaged position.

The step of moving the clamp device 22 includes moving the clamp device 22 from the engaged position toward the retracted position. The clamp device 22 remains secured to the first one of the cover 12 and body 14 in a manner that does not prevent the cover 12 from opening relative to the body.

The step of moving the clamp device 22 can include moving the clamp device 22 linearly, although alternatives are possible. For example, the step of moving the clamp device 22 can include a step of the driver arrangement 52 mounted on the clamp devices 22 moving the clamp device 22 between the engaged and retracted positions. The step of moving the clamp device 22 can include a step of linearly moving the driver arrangement 52 to move the clamp device 22 between engaged and retracted positons.

The method can further include a step of moving the clamp device 22 upon guide members 74 associated with the clamp device 22 between the engaged and retracted positions, and a step of utilizing the end retraction stop arrangement 78 to prevent the clamp device 22 from separating from the body 14 of the explosion-proof enclosure 10 when in the retracted position. In other examples, the method can include a step of moving multiple clamp devices 22 between the engaged and retracted positions.

From the forgoing detailed description, it will be evident that modifications and variations can be made without departing from the spirit and scope of the disclosure.

Figure 8:
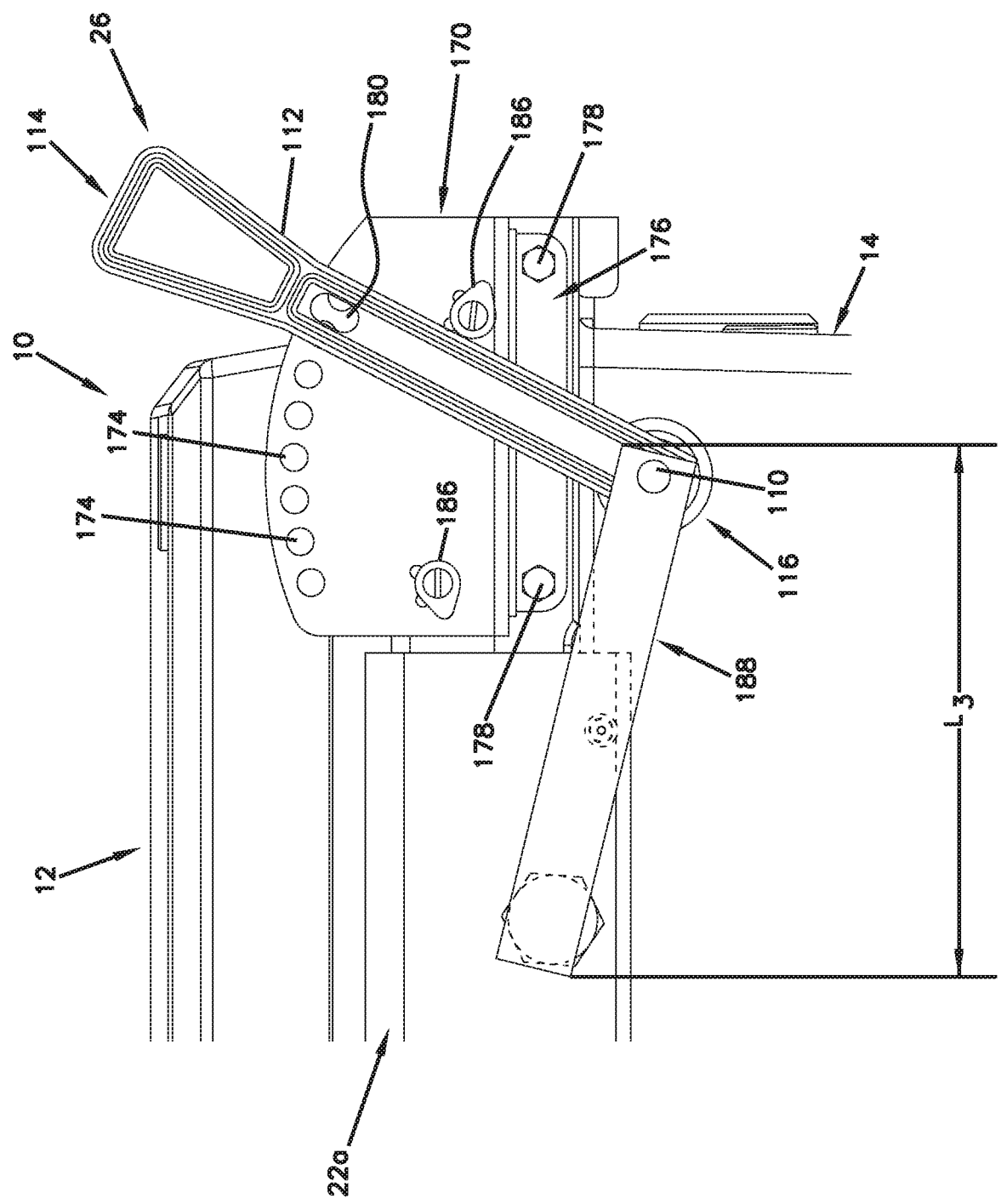
FIG. 8 is a side schematic fragmentary view of a portion of the enclosure shown in FIG. 1 depicting a visual indicator in a position inhibiting access to the clamp device in accord with principles of the present disclosure.
Figure 9:
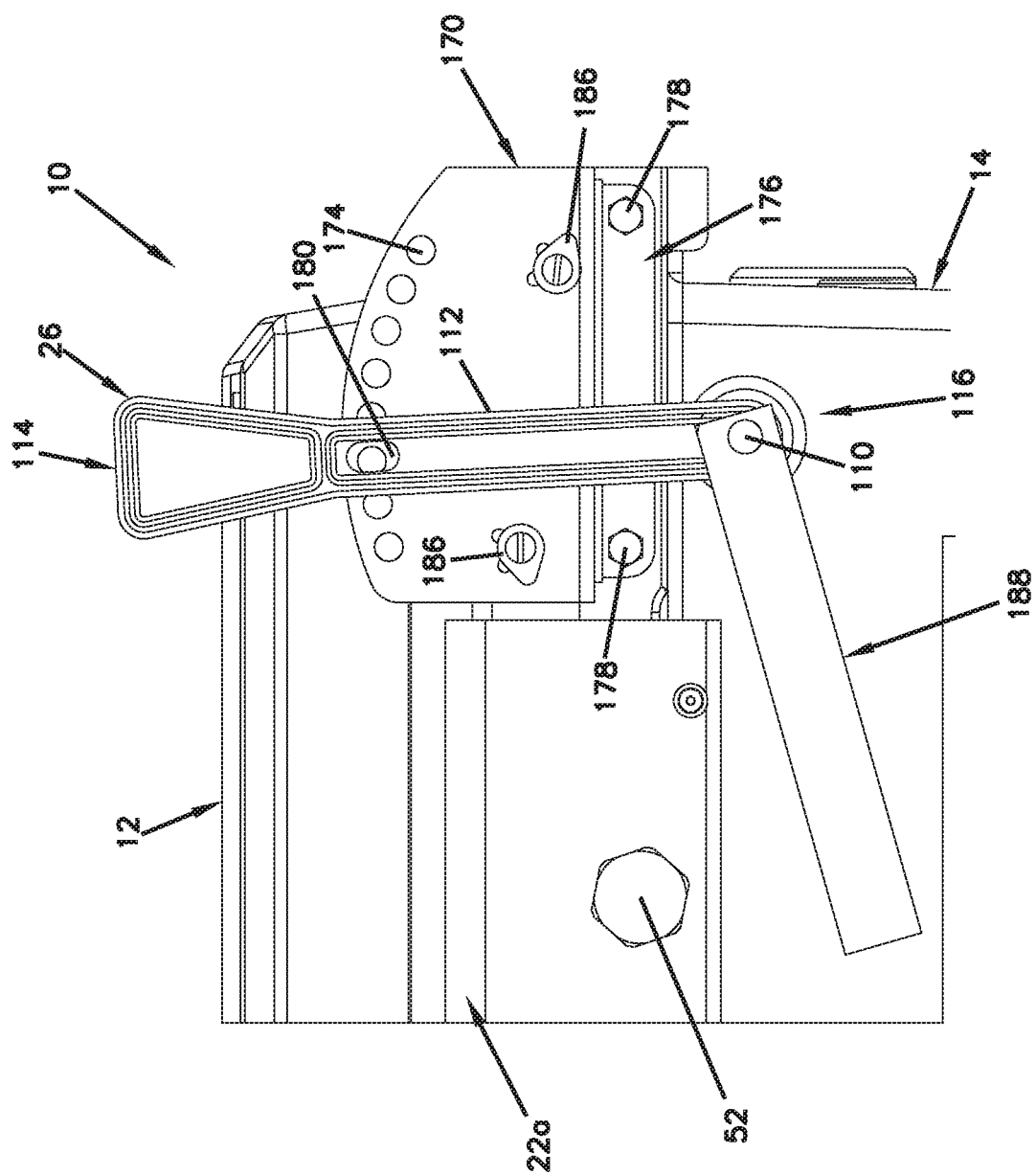
FIG. 9 is a side schematic fragmentary view of the portion of the enclosure shown in FIG. 8 depicting the visual indicator in a position facilitating access to the clamp device in accord with principles of the present disclosure.

III. An Example Visual Indicator for An Example Enclosure; FIGS. 8 and 9

Hazardous explosion-proof enclosures need to be opened carefully. In particular, the explosion-proof enclosures should not be opened while electrical equipment located therein is still electronically active because sparks may cause an explosion. Thus, in certain instances it is important to make sure that the electrical equipment is switched off before the enclosure is opened to avoid explosion or fire.

Typically an on/off control handle is mounted externally to the explosion-proof enclosure to accomplish this. A visual indicator is needed to inform an operator when the electrical equipment is "on" or "off". Preferably, the visual indicator is positioned such that when the electrical equipment is "on," it inhibits access to opening the explosion-proof enclosure until the control handle turns the electrical equipment "off."

Referring to FIGS. 8-9, a portion of the example explosion-proof enclosure 10 is shown. As previously characterized the explosion-proof enclosure 10 includes the cover 12 and body 14. The depicted explosion-proof enclosure 10 includes a control handle 26 with a lever arm 112 having a distal end 114 and a proximal end 116. The control handle is shown mounted on the explosion-proof enclosure 10 and can be moveable between a first rotational position and a second rotational position.

A closure arrangement 22a is shown mounted on the explosion-proof enclosure 10. The clamp arrangement 11 is an example of the closure arrangement 22a. Other examples of the closure arrangement 22a can include the prior art bolts and other clamp systems. The closure arrangement 22a can be used to secure the explosion-proof enclosure arrangement 10 closed, or to provide that the explosion-proof enclosure can be opened.

The example explosion-proof enclosure 10 further includes an example visual indicator 188 shown mounted at the proximal end 116 of the control handle 26 by, for example, a mechanical fastener 110. It will be appreciated that the visual indicator 188 may be used on other explosion-proof enclosures. In other examples, the visual indicator 188 may be mounted using alternative methods, such as but not limited to, adhesive. When the control handle 26 is in the first rotational position (see FIG. 8), the visual indicator 188 inhibits access to the closure arrangement 22a. When the control handle 26 is in the second rotational position (see FIG. 9), the visual indicator 188 facilitates access to the closure arrangement 22a.

The visual indicator 188 is an external visual to a user to show when an electrical component is powered on or off. As such, the visual indicator 188 inhibits access to the closure arrangement 22a when an electrical component is on, thereby keeping the operator safe from electrically live elements inside the explosion-proof enclosure 10. Unlike internal lock methods, the visual indicator 188 has an obvious visual aspect that reminds and shows an operator that power is on inside the explosion-proof enclosure 10. This design will help eliminate confusion as to whether the internal lock is engaged or if the cover is stuck.

For example, when the control handle 26 is rotationally positioned in the first rotational position, the electrical component is placed in a first operating configuration, typically "on". When the control handle 26 is in the first rotational position, the visual indicator 188 may cover a portion of the closure arrangement 22a to inhibit an operator from moving the closure arrangement 22a from the engaged position to the retracted position. When the control handle 26 is rotationally positioned in the second rotational position, the electrical component is placed in a second operating configuration, typically "off". When the control handle is moved toward the second rotational position, the visual indicator is removed from the portion of the closure arrangement 22a to facilitate access and allow an operator to move the enclosure arrangement 22a from the engaged position to the retracted position.

The visual indicator 188 may be used with the clamp device 22 previously characterized. The visual indicator 188 may cover the driver arrangement 52 to physically inhibit access to the clamp device 22. The visual indicator 188 provides a warning to the operator that an electrical component is powered on and removal of the clamp device 22 may not be safe. It will be appreciated that the visual indicator 188 can have a length sufficient to cover at least a corner of the clamp device 22.

In certain examples, the visual indicator 188 is a strip mounted to rotate with the control handle 26 of the explosion-proof enclosure 10, although alternatives are possible. The visual indicator 188 may be formed from one or more of a number of suitable materials, including metal (e.g., alloy, stainless steel), plastic, some other material, or any combination thereof.

The example visual indicator 188 has a length, $L_3$ that extends a distance to cover the driver arrangement 52, but alternatives are possible. It will be appreciated that the shape and size of the visual indicator 188 may vary as desired, for example, the visual indicator 188 may be shorter in length $L_3$.

The explosion-proof enclosure 10 may also include an example lockout plate 170 for temporary attachment of the control handle 26 in a desired position between the first and second rotational positions. The example lockout plate 170 comprises a body 172 defining a plurality of apertures 174 adapted for securing the control handle 26.

The control handle 26 is normally pivotable between first and second extremities of travel. In one example, the pivot of the control handle 26 is recessed within the body 14. Conventionally, when the control handle 26 is at one extremity of travel (see FIG. 8) an electrical connection is made with active electrical equipment inside the explosion-proof enclosure 10. The control handle 26 can be locked in this extreme position by a fastener (now shown). The fastener can be inserted through both an opening 180 defined in the lever arm 112 of the control handle and one of the apertures 174 of the lockout plate 170 to be secured therein.

When the control handle 26 is moved toward its other extremity of travel, the same electrical connection is broken. Again, the control handle 26 can be locked in this extreme position by aligning a fastener through the opening 180 of the lever arm 112 with one of the apertures 174 of the lockout plate 170. It will be appreciated that the control handle 26 can be locked in any position along the lockout plate 170 as desired for controlling various types of active electrical components. In the depicted example, the explosion-proof enclosure 10 includes a label 182 (see FIG. 5) mounted to the body 14 thereof by fasteners 184 indicating "on" and "off" positions. The control handle 26 travels between the "on" and "off" positions for switching an electrical component to corresponding "on" and "off" configurations.

The lockout plate 170 includes end stops 186 located at opposite ends of the extreme positions. The end stops 186 prevent over travel of the control handle 26. The end stops 186 can be made of one or more of a number of materials. Examples of such materials con include, but are not limited to, steel, rubber, and aluminum.

In the depicted example, the lockout plate 170 includes a flange plate 176 to secure the lockout plate 170 to the body 14 of the explosion-proof enclosure 10 by fasteners 178. The flange plate 176 is an L-shaped flange. The flange plate 176 and the body 172 of the lockout plate 170 can be integrally or unitarily formed elements or alternatively separately formed elements that are connect together. The lockout plate 170 can be made of one or more of a number of materials. Examples of such materials con include, but are not limited to, steel, rubber, and aluminum.

The present disclosure also relates to a method of opening the explosion-proof enclosure 10. The method includes: 1) a step of observing the visual indicator 188 of the explosion-proof enclosure arrangement, the visual indicator can be positioned to inhibit access to the closure arrangement 22*a* when the control handle 26 of the explosion-proof enclosure 10 is in a first rotational position; 2) a step of shifting the control handle 26 from the first rotational position to the second rotational position to cause the visual indicator 188 to move away from the closure arrangement 22*a* to facilitate access thereto before opening; and 3) a step of opening the explosion-proof enclosure 10.

In one example, the step of observing the visual indicator 188 in the first rotational position is a step of observing an on-position, and the step of observing the visual indicator 188 in the second rotational position is a step of observing an off-position. As previously indicated, the step of inhibiting access includes preventing the closure arrangement 22*a* from being moved between the engaged position and the retracted position on the explosion-proof enclosure 10. Further, the step of facilitating access includes allowing the closure arrangement 22*a* to be moved between an engaged position and a retracted position on the explosion-proof enclosure 10.

From the forgoing detailed description, it will be evident that modifications and variations can be made without departing from the spirit and scope of the disclosure.

Figure 2:
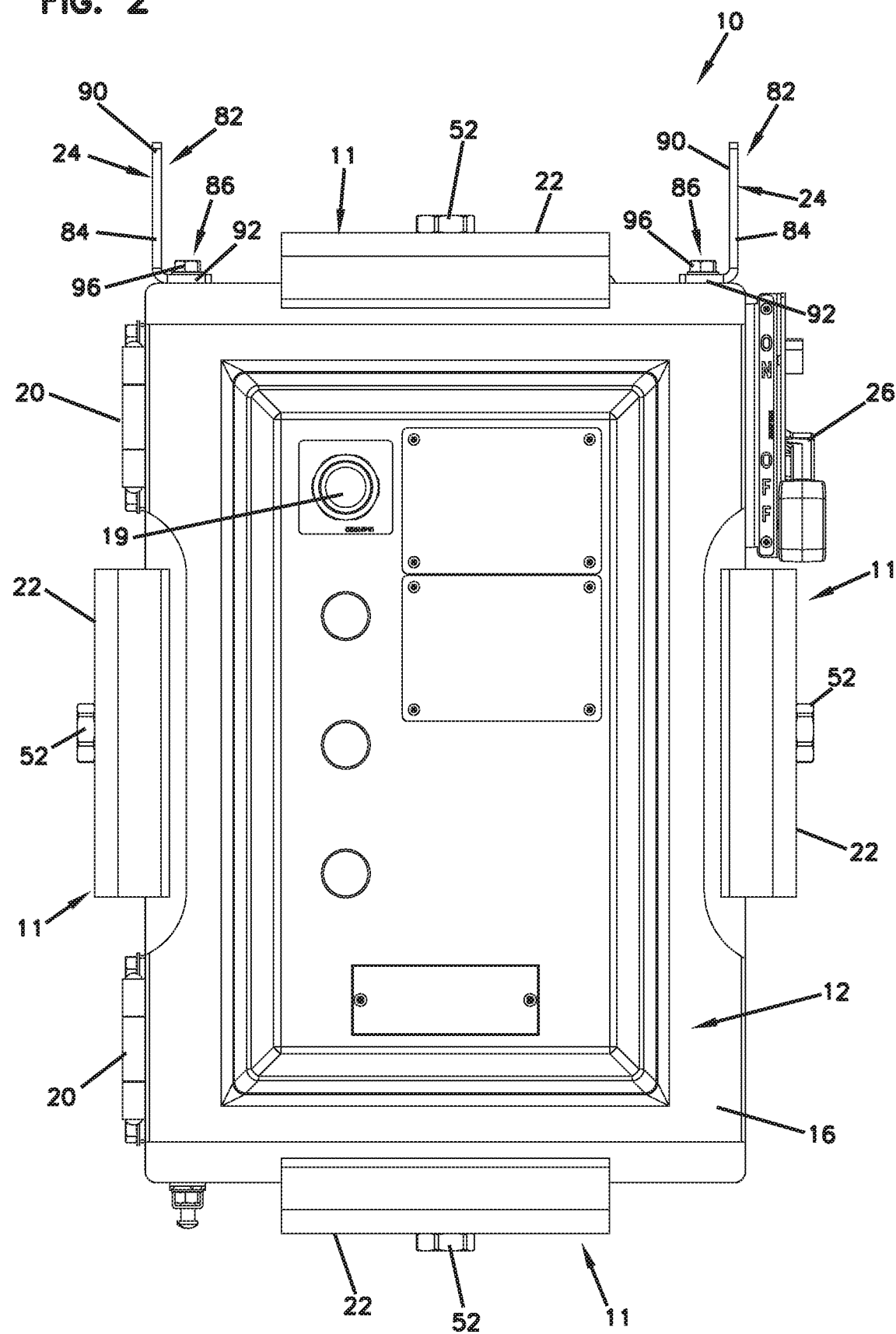
FIG. 2 is a schematic front view of the enclosure shown in FIG. 1.
Figure 3:
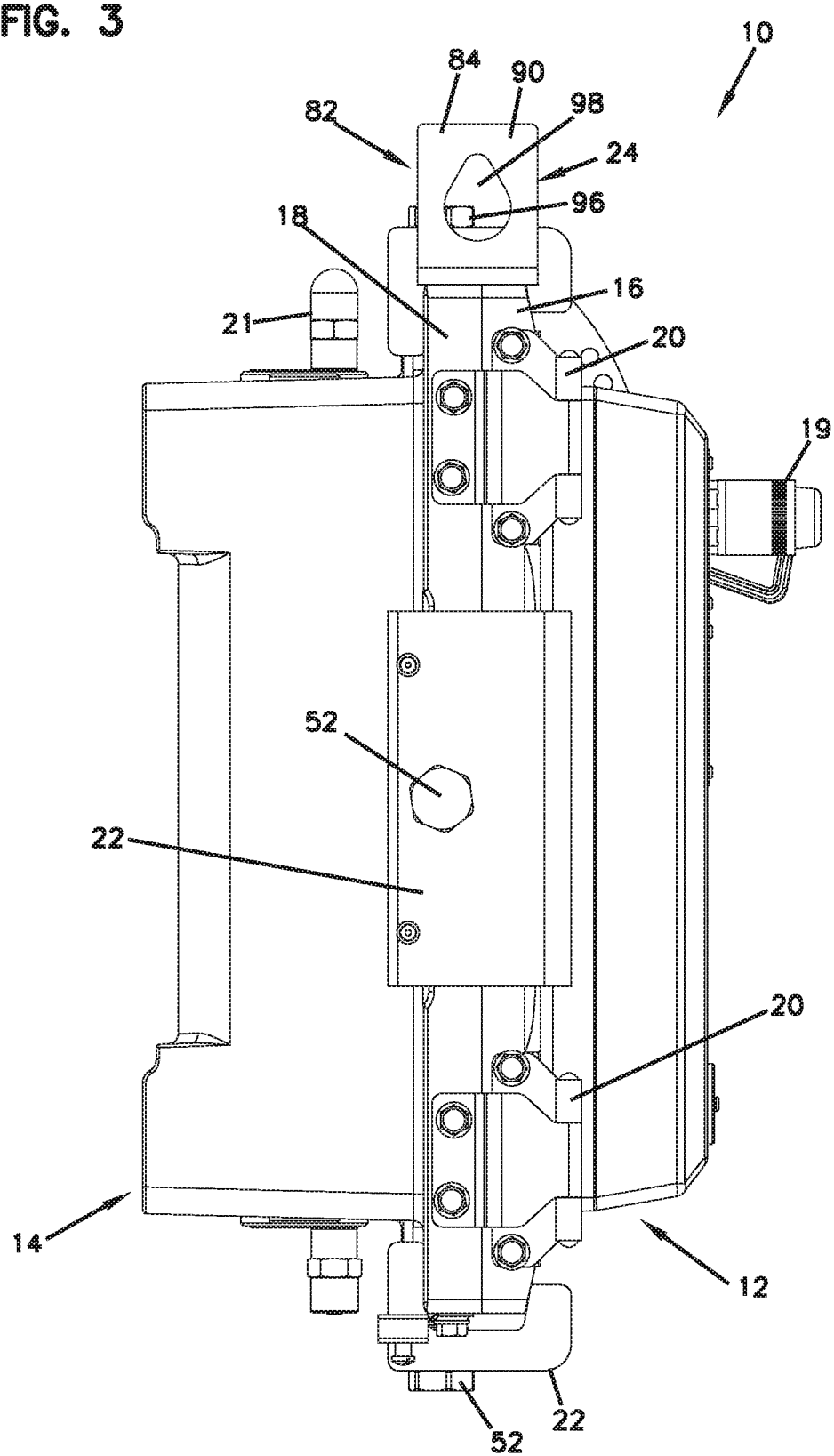
FIG. 3 is a schematic side view of the enclosure shown in FIG. 1.
Figure 4:
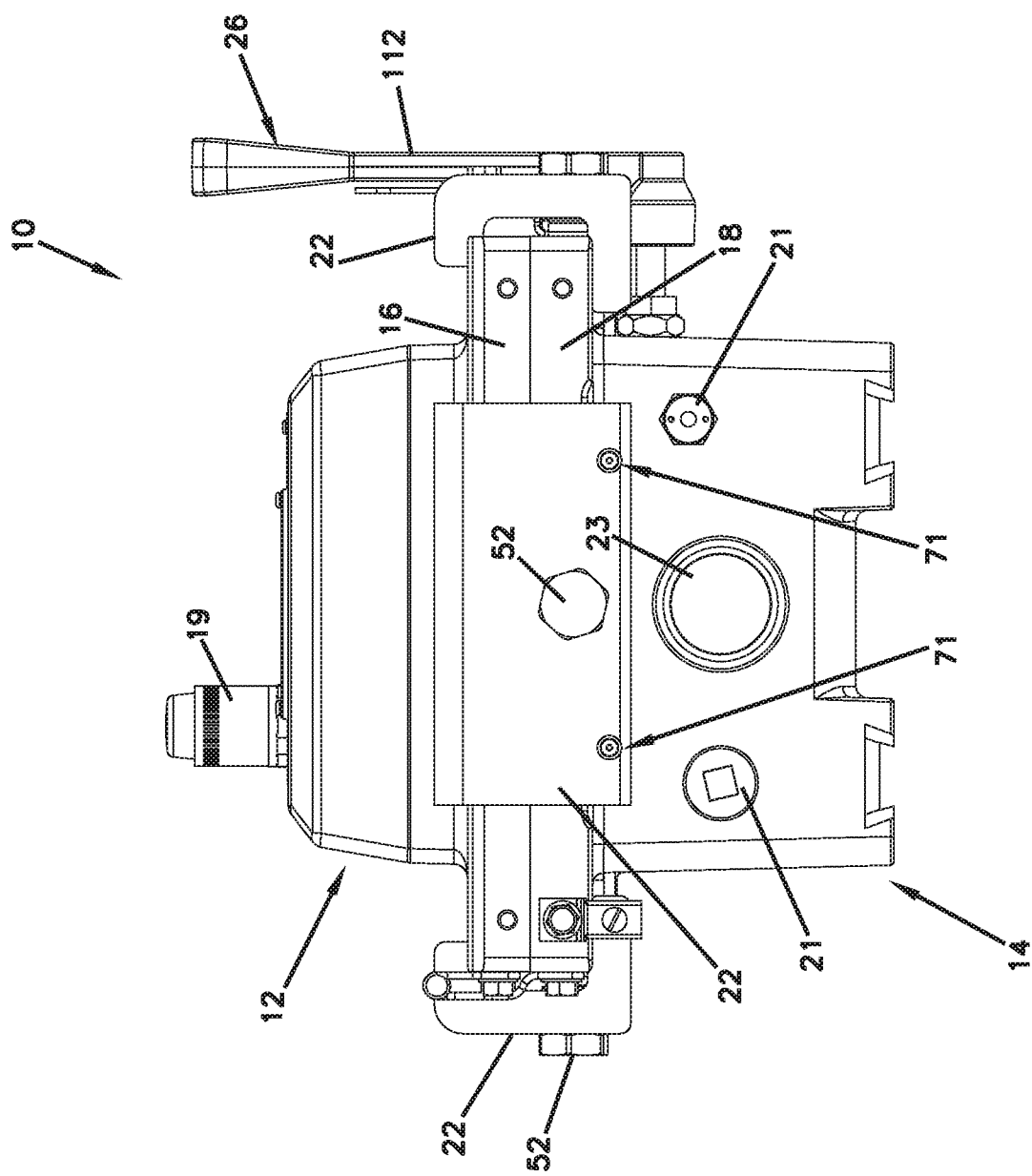
FIG. 4 is a schematic bottom end view of the enclosure shown in FIG. 1.

IV. An Example Enclosure Handling Assist Arrangement for An Enclosure; FIGS. 1-3

In certain conventional hazardous enclosures including a cover and a Body, and enclosed equipment can be large and heavy to transfer or lift, for example, they can often be 250-300 lbs. As such, moving the enclosures require safe transfer and/or lifting mechanisms. Typically, conventional hazardous enclosures include a single bracket centrally positioned on the body of the enclosure for lifting or moving the enclosure. One issue with such a design is that there could be a failure during transfer of the enclosure if the bracket is not completely secured to the enclosure.

In addition, if the bracket fails when the enclosure is lifted, the cover of the enclosure may swing open and cause damage if not secured to the body of the enclosure.

Another issue is that sometimes after the explosion-proof enclosures have been in a hazardous environment, it can be difficult to open the explosion-proof enclosure.

Improvements in transferring/lifting and opening hazardous enclosures are desired.

Turning again to FIGS. 1-3, the example explosion-proof enclosure 10 is depicted. The explosion-proof enclosure 10 has been previously characterized as including the cover 12 having the cover perimeter flange 16 and the body 14 having the body perimeter flange 18. The cover and body can be openable along the joint 94 between the cover perimeter flange 16 and the body perimeter flange 18. The explosion-proof enclosure 10 may optionally include an example enclosure handling assist arrangement 24. It will be appreciated that the handling assist arrangement 24 may be used with other explosion-proof enclosure arrangements. The example enclosure handling assist arrangement 24 has a hanging, closure-assist, orientation and an opening-assist orientation.

The example enclosure handling assist arrangement 24 includes at least one hanger and fastening arrangement 82; although any number of enclosure handling assist arrangements 24 is possible. In the example depicted, two hanger and fastening arrangements 82 are shown on opposite sides of a top of the explosion-proof enclosure 10. Such a configuration creates a redundancy that increases safety while lifting the explosion-proof enclosure 10.

Each one of the hanger and fastening arrangements 82 include a hanger member 84 and a removable attachment arrangement 85. In the hanging, closure-assist, orientation, the hanger and fastening arrangements 82 may be used to mount the explosion-proof enclosure 10 to one or more of a number of surfaces and/or elements, including but not limited to a wall, a control cabinet, a cement block, an I-beam, and a U-bracket. The hanger members 84 can be mounted using one or more methods, including but not limited to welding, fastening devices, and mating threads.

The removable attachment arrangement 85 includes a first removable attachment member 86 and a second removable attachment member 88. The first removable attachment member 86 can be positioned on the cover perimeter flange 16 and the second removable attachment member 88 can be positioned on the body perimeter flange 18. The first and second removable attachment members 86, 88 can be positioned adjacent, and spaced from one another across the joint 94 located between the cover and body perimeter flanges 16, 18 to form an explosion proof joint therebetween.

The hanger member 84 is fastened to both halves of the explosion-proof enclosure 10 to help ensure that that the cover 12 does not swing open or fall off during lifting or moving of the explosion-proof enclosure 10.

In the hanging, closure-assist, orientation, each one of the hanger and fastening arrangements 82 can be configured with the hanger member 84 secured across the joint 94 by the first and second removable attachment members 86, 88 and the hanger member 84 is positioned across the cover and body perimeter flanges 16, 18. The cover 12 and body 14 of the explosion-proof enclosure 10 may be hingeably attached.

The first removable attachment member 86 can be threadably connected to the cover perimeter flange 16 and the second removable attachment member 88 can be threadably connected to the body perimeter flange 18, although alternatives are possible. The first and second removable attachment members 86, 88 are threadably coupled tightly to the hanger member 84. Therefore, although the first and second removable attachment members 86, 88 are driven through the hanger member 84 to respective cover and body perimeter flanges 16, 18, no stress is applied thereon to cause bending or twisting of the hanger member 84.

In the opening-assist, orientation, the hanger member 84 has been removed from attachment to the explosion-proof enclosure 10. In the opening-assist, orientation, a first fastener (e.g., mechanical fastener) can be replaced in the cover perimeter flange 16 and a second fastener (e.g., mechanical fastener) can be replaced in the body perimeter flange 18. The first fastener can be the first removable attachment member 86 and the second fastener can be the second removable attachment member 88, although alternatives are possible.

In accord with the principles described herein, the first and second removable attachment members 86, 88 can be positioned such that the cover 12 and body 14 can be pried apart by prying the first and second removable attachment members 86, 88 apart. For example, the first and second attachment members 86, 88 each include a head 96 that extends upwardly from the cover and body perimeter flanges 16, 18 when connected thereto. It will be appreciated that other mechanical fasteners may be used to pry the cover 12 and body 14.

A pry point is created on top of the explosion-proof enclosure 10 between the heads 96 of the first and second attachment members 86, 88, safely outside of the flame path. The pry point is easy to access and safe to pry against. In certain examples, the heads 96 of the first and second attachment members 86, 88 can be used as leverage by a user for safely prying into the explosion-proof enclosure 10 to open a stuck enclosure. As such, a user does not have to yank on the cover 12 causing jerking motion and possible injury to the user. Nor does the user need to pull on something not designed to be used as a pull point on the explosion-proof enclosure 10. The first and second attachment members 86, 88 can be replaced by the user if they become bent or damaged over time.

In the example depicted, the hanger member 84 is an angled bracket, although alternatives are possible. The hanger member 84 is generally L-shaped having a vertical section 90 and a horizontal section 92, although alternatives are possible. The hanger member 84 is typically cut from a metal, such as, but not limited to, aluminum or standard steel, and has a dimension sufficient to support a substantial load.

The hanger member 84 includes two holes drilled or cut in the horizontal section 92 of the hanger member 84 for the purpose of respectively receiving first and second removable attachment members 86, 88. The first and second removable attachment members 86, 88 are arranged and configured for respectively securing the hanger member 84 to the cover and body perimeter flanges 16, 18.

The head 96 can be a threaded nut. The heads 96 of the first and second attachment members 86, 88 can be shaped and/or configured to accommodate one or more of a number of tools, which can be used to hold in place and/or move (e.g., rotate) the head 96. For example, the head 96, when looking from above, may be shaped like a hexagon (as for receiving a socket or a wrench), although alternatives are possible. As another example, the head 96 may have a slot (as for receiving a screw driver), although alternatives are possible. As another example, the head 96 can include a protrusion from which two slotted wings extend laterally in opposite directions, as with a wing nut, although alternatives are possible.

In the depicted example, the vertical sections 90 of the hanger members 84 each define an opening 98 for receiving structural elements (e.g., crane, etc.) that can be used to move the explosion-proof enclosure 10.

The present disclosure also relates to an example method of positioning the explosion-proof enclosure 10. The method includes: 1) a step of lifting the explosion-proof enclosure 10 by the handling assist arrangement 24. The handling assist arrangement 24 has at least one hanger and fastening arrangement 82. The at least one hanger and fastening arrangement 82 includes a first hanger member 84 and first and second removable attachment members 86, 88; 2) a step of removing the first hanger member 84 of the at least one hanger and fastening arrangement 82; and 3) a step of replacing the first and second removable attachment members 86, 88 of the at least one hanger and fastening arrangement 82. The method can further include a step of prying the explosion-proof enclosure 10 open by prying the first and second removable attachment members 86, 88 away from one another.

Another method includes: 1) a step of lifting the explosion-proof enclosure 10 by the handling assist arrangement 24. The handling assist arrangement 24 has at least one hanger and fastening arrangement 82. The at least one hanger and fastening arrangement 82 includes a first hanger member 84 and first and second removable attachment members 86, 88; 2) a step of removing the first hanger member 84 of the at least one hanger and fastening arrangement 82; and 3) a step of placing first and second fasteners. The method can further include a step of prying the explosion-proof enclosure 10 open by prying the first and second fasteners away from one another. The first and second fasteners can respectively be the first and second removable attachment members 86, 88 of the at least one hanger and fastening arrangement 82, although alternatives are possible.

An example method according to the present disclosure includes: 1) a step of prying the explosion-proof enclosure 10 open by prying against the first removable attachment member 86 attached to the cover 12 and the second removable attached member 88 attached to the body 14. The step of prying against the first and second removable attachment members 86, 88 includes the first and second removable attachment members 86, 88 being threaded bolts. It will be appreciated that other mechanical fasteners that the first and second removable attachment members 86, 88 may be used to pry the cover 12 and body 14.

From the forgoing detailed description, it will be evident that modifications and variations can be made without departing from the spirit and scope of the disclosure.

Figure 10:
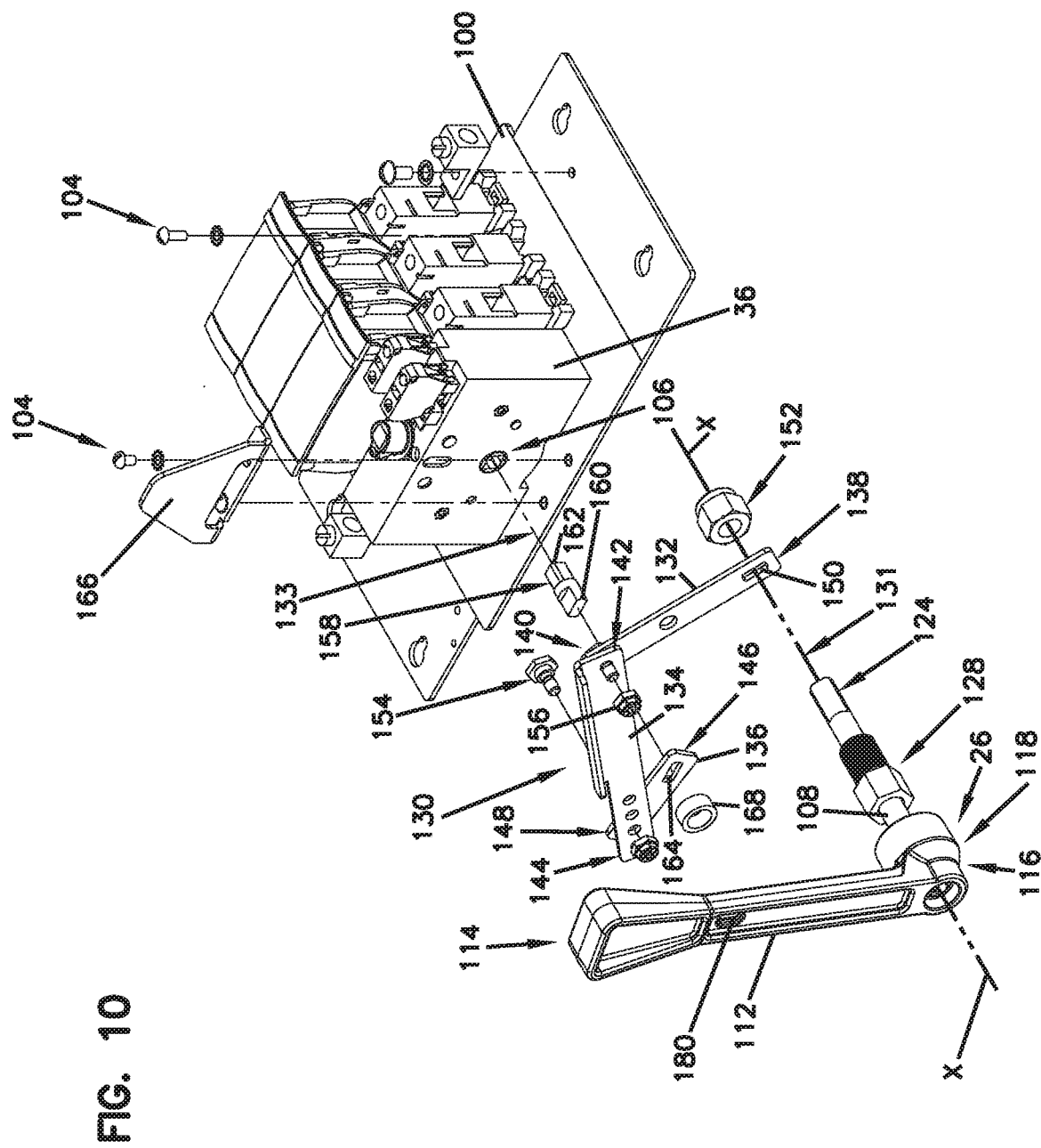
FIG. 10 is an exploded schematic view of features depicted in FIG. 5 of the enclosure of FIG. 1.
Figure 10A:
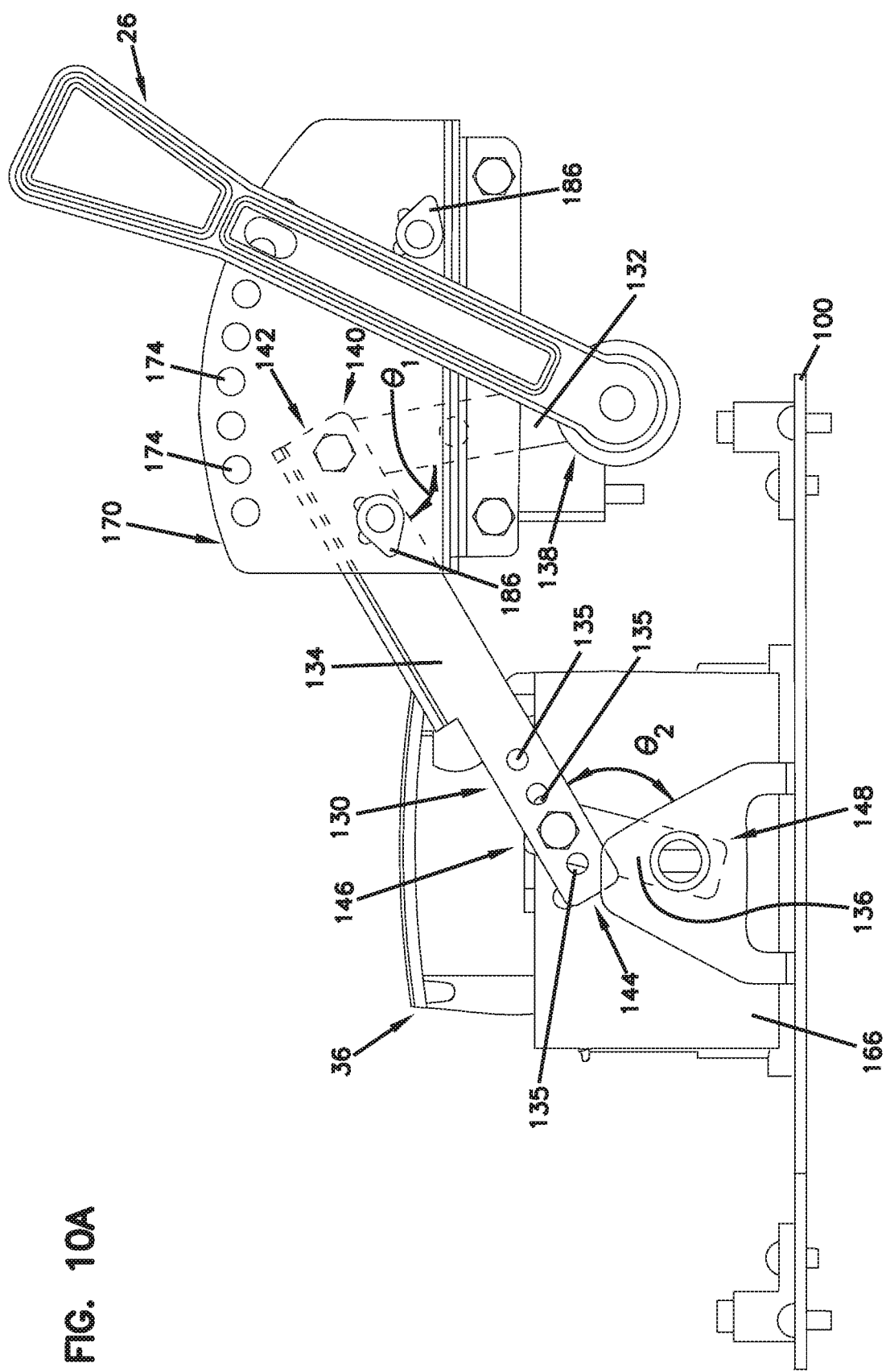
FIG. 10A is a side schematic fragmentary view depicting a rotation-increasing mechanical link arrangement in accord with principles of the present disclosure including the control handle of FIG. 5 in an on-position.
Figure 10B:
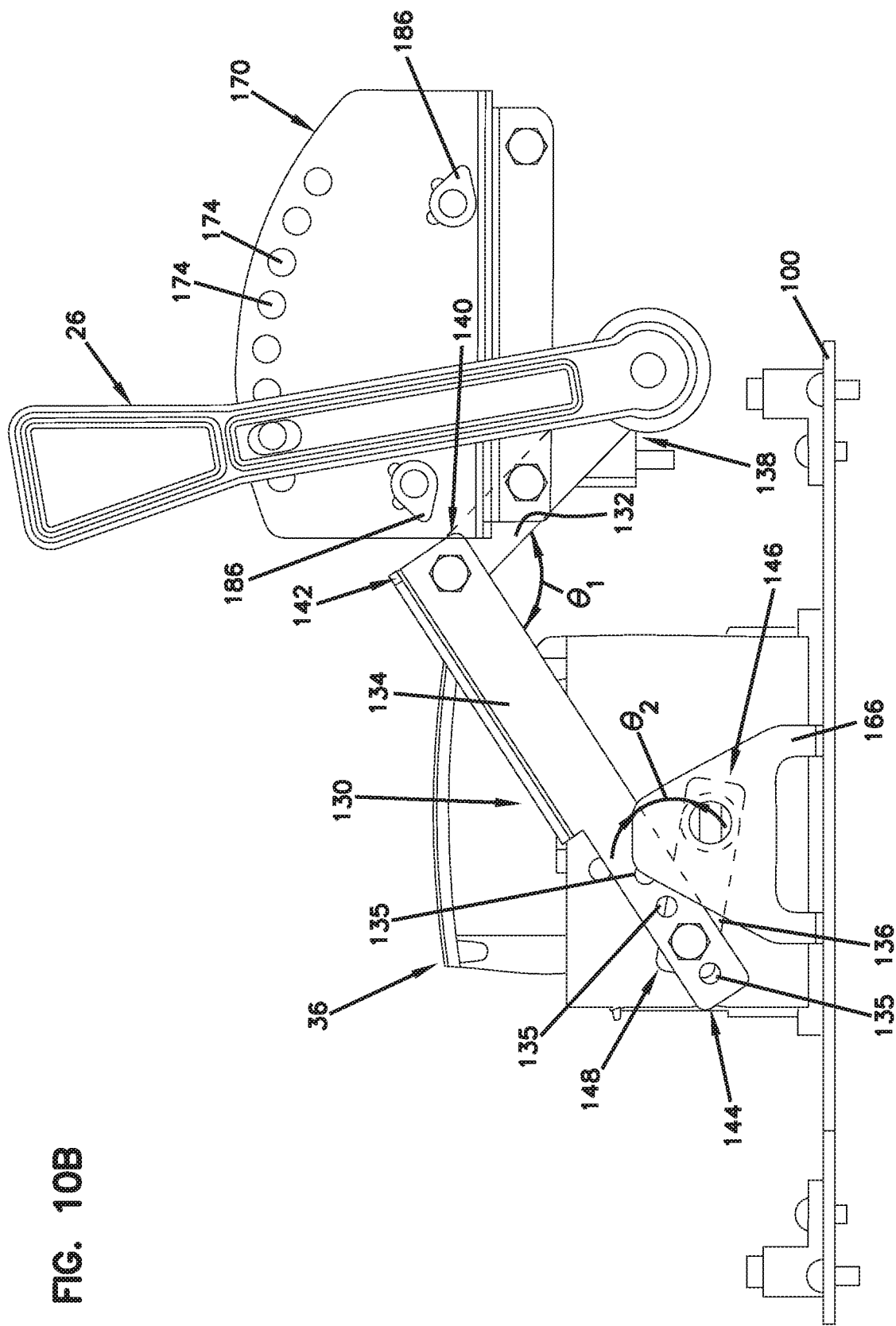
FIG. 10B is a side schematic fragmentary view depicting the rotation-increasing mechanical link arrangement shown in FIG. 10A with the control handle of FIG. 10A in an off-position.

V. An Example Control Handle for An Enclosure; FIGS. 5 and 10

As previously characterized, the explosion-proof enclosure 10 includes the cover 12 and the body 14. The body 14 defines the chamber 34 for receiving circuit breakers, motor starters, switches, relays, terminals and/or meters, for example. An electrical component 36 can be mounted within the chamber 34 of the body 14. The electrical component can having a rotating switch device 106 configured to move about a first arc of rotational motion between a first operating configuration and a second operating configuration. In the depicted example, the first operating configuration can be a power-on configuration and the second operating configuration can be a power-off configuration, although alternatives are possible.

As used herein, the term, "between" and variants thereof, in this context, means that the rotating switch device 106 may be moved in a direction from either one of the first recited position toward the second or the second recited position toward the first. Furthermore, in this context, the term "between" is not meant to necessarily indicate, unless specifically stated, that the motion is entirely between the two recited positions. Thus, the characterized motion can be along a path between the two recited positions, such that, the motion is from a direction of one position toward the other position or from a direction of the other position toward the one position.

Turning again to FIG. 5, an exploded view of the example control handle 26 is shown outside of the explosion-proof enclosure 10. The control handle 26 can be mounted externally to the body 14 of the explosion-proof enclosure 10. The control handle 26 depicted does not require that any parts be machined or coupled on or within the cover 12. Because the control handle 26 is mounted externally, more open space is provided in the explosion-proof enclosure 10 for wiring and assembling. Such a design provides allows for a rotary disconnect to be used instead of a toggle operated disconnect.

The control handle 26 can be configured to move about a second arc of rotational motion between a first rotational position and a second rotational position. The first rotational position can be an on-position causing the rotating switch device 106 (see FIG. 10) to be in the power-on configuration, and the second rotational position can be an off-position causing the rotating switch device 106 to be in the power-off configuration.

As used herein, the term, "between" and variants thereof, in this context, means that the control handle 26 may be moved in a direction from either one of the first recited position toward the second or the second recited position toward the first. Furthermore, in this context, the term "between" is not meant to necessarily indicate, unless specifically stated, that the motion is entirely between the two recited positions. Thus, the characterized motion can be along a path between the two recited positions, such that, the motion is from a direction of one position toward the other position or from a direction of the other position toward the one position.

The explosion-proof enclosure arrangement 10 can include an example rotation-increasing mechanical link arrangement 130 (i.e., an offset end axis link arrangement) that links the control handle 26 to the rotating switch device 106.

The first arc of rotational motion can be greater than the second arc of rotational motion, although alternatives are possible. The first arc of rotational motion can be less than the second arc or rotational motion, although alternatives are possible. For example, the first arc of rotational motion can be equal to the second arc of rotational motion, although alternatives are possible.

Referring to FIGS. 10, 10A, 10B, 10C, the example rotation-increasing mechanical link arrangement 130 is depicted. The example rotation-increasing mechanical link arrangement 130 can be positioned within the cavity 34 of the body 14 of the explosion-proof enclosure 10 adjacent the electrical component 36.

As used herein, the term, "a rotation-increasing mechanical link arrangement," is defined as being an arrangement that, when it is rotated by something (for example a control handle or lever 26) at a first end at a first mount, at the opposite second end it rotates whatever it is engaged to (for example a rotating switch device 106) by a greater second amount.

Although the rotation-increasing mechanical link arrangement 130 is described herein, other mechanical link arrangements may be used that can provide rotation at one end to be lesser or equal to rotation at the other end.

The rotation-increasing mechanical link arrangement 130 is connected to the control handle 26 and the rotating switch device 106 to translate angular motion externally about the second arc of rotational motion to internally about the first arc of rotational motion.

The control handle 26 is mechanically coupled to a rotatable elongate shaft arrangement 108 by a mechanical fastener 110, including but not limited to a bolt (which may be coupled with a nut), or a screw (which may be coupled with a nut). The elongate shaft arrangement 108 can be rotated through the second arc of rotational motion as does the control handle 26.

Figure 10C:
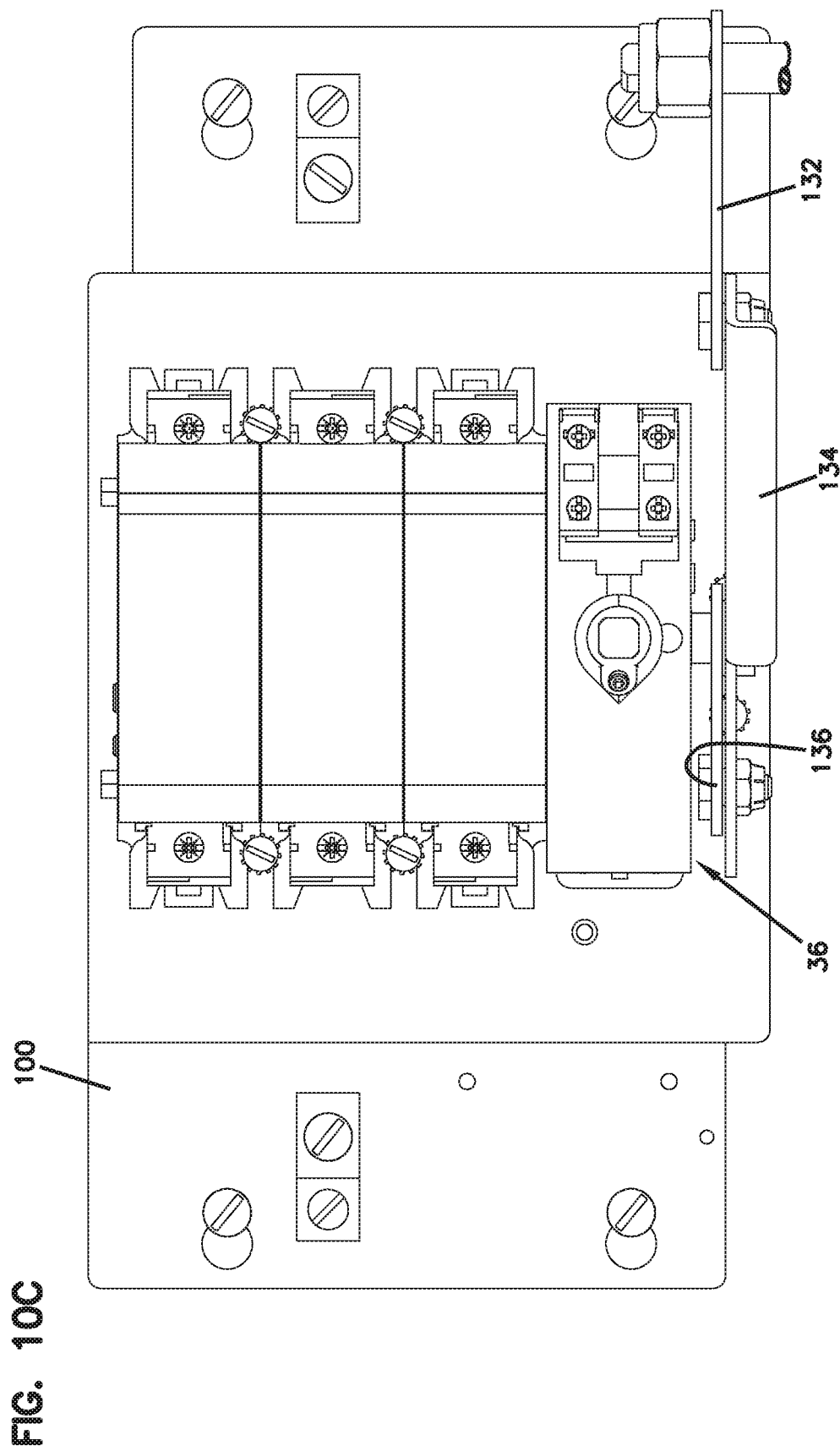
FIG. 10C is a top schematic view of the rotational-increasing mechanical link arrangement shown in FIG. 10A.

The example rotation-increasing mechanical link arrangement 130 includes a handle link 132, a switch link 136, and a translation link 134 positioned between the handle link 32 and the switch link 136. The rotation-increasing mechanical link arrangement 130 is configured such that when the control handle 26 is in the off-position, the switch link 136 is directed from a portion of the translation link 134 in extension towards the handle link 132 and forms an acute angle with the translation link 134, although alternatives are possible. In the on-position, the switch link 136 is angled out away from the handle link 132, although alternatives are possible. FIG. 10C shows the handle link 132, the switch link 136, and the translation link 134 in a single plane.

In one example, when the control handle 26 is in the off, second rotational position, an angle $\theta_1$ between the handle link 132 and the translation link 134 is more than 90 degrees and an angle $\theta_2$ between the switch link 136 and the translation link 134 is less than 90 degrees. In other examples, when the control handle 26 is in the off, second rotational position, the angle $\theta_1$ between the handle link 132 and the translation link 134 is an obtuse angle and the angle $\theta_2$ between the switch link 136 and the translation link 134 is an acute angle.

When the control handle 26 is in the on, first rotational position, the angle $\theta_1$ between the handle link 132 and the translation link 134 is less than 90 degrees and the angle $\theta_2$ between the switch link 136 and the translation link 134 is greater than 90 degrees. In other examples, when the control handle 26 is in the on, first rotational position, the angle $\theta_1$ between the handle link 132 and the translation link 134 is an acute angle and the angle $\theta_2$ between the switch link 136 and the translation link 134 is an obtuse angle.

The handle link 132 is mounted on the elongate shaft arrangement 108 to rotate through the second arc of rotational motion as does the elongate shaft arrangement 108 and the control handle 26 as the control handle 26 is moved. The switch link 136 is mounted on the rotating switch device 106 to rotate through the first arc of rotational motion to move the rotating switch device 106 between first and second operating configurations upon rotation of the control handle 26. In the depicted example, because the switch link 136 has a length that is shorter than the handle link 132, the first and second arc of rotational motions of the respective switch and handle links 136, 132 are different. In one example, the length of the switch link 136 is no more than 60% of the handle link 132 and is no more than 40% of the translation link 134, although alternatives are possible.

The handle link 132 has a first end 138 and a second end 140. The translation link 134 has a first end 142 and a second end 144. The switch link 136 has a first end 146 and a second end 148. The first end 138 of the handle link 132 is non-pivotally attached to the shaft 108 through opening 150 defined at the first end 138 of the handle link 132. A fastener 152 is positioned on the elongate shaft 108 to secure the handle link 132 thereon inside the chamber 34 of the body 14. The second end 140 of the handle link 132 is pivotally attached to the translation link 134 at the first end 142 thereof by a fastener 154 (e.g., pivot pin or the like) which is shown coupled with a nut 156. The second end 144 of the translation link 134 is pivotally attached to the switch link 136 at the second end 148 thereof by the fastener 154 and nut 156. The location of the pivotal attachment of the second end 144 of the translation link 134 to the second end 148 of the switch link 136 may vary as needed with different types of equipment. For example, the translation link 134 defines a plurality of openings 135 for connecting with the switch link 136.

Typically, the second arc of rotational motion moves through an angle of no more than 60 degrees. Often, the second arc of rotational motion moves through an angle of no more than 50 degrees. Usually, the second arc of rotational motion is no more than 60 percent of the first arc of rotational motion. Typically, the first arc of rotational motion moves through an angle of at least 70 degrees. Often, the first arc of rotational motion moves through an angle of at least 90 degrees.

The control handle 26 includes a tubular member 118. The lever arm 112 of the control handle 26 having its proximal end 116 attached to the tubular member 118. The lever arm 112 and the tubular member 118 can be integrally or unitarily formed elements or alternatively separately formed elements that are connect together.

The elongate shaft 108 can include a first portion 120 which can define a notch 122 formed in its periphery and a second portion 124 adjacent the first portion 120, and which the second portion 124 can have a relatively flat, generally rectangular shaped head. The tubular member 118 defines an insertion opening 126 for receiving the first portion 120 of the elongate shaft 108.

The second portion 124 of the elongate shaft 108 is received within a through hole (not shown) of the body 14 of the explosion-proof enclosure 10 and can rotate freely therein. A threaded bearing 128 is shown mounted over the second portion 124 of the shaft 108 for rotatably supporting the control handle 26 and the elongate shaft 108. The threaded bearing 128 is threaded within the opening of the body 14 to secure the elongate shaft 108 on the body 14 of the explosion-proof enclosure 10.

The explosion-proof enclosure 10 can include a drive stud 158 pivotally attached to the rotation-increasing mechanical link arrangement 130. The drive stud 158 can be engaged with the rotating switch device 106 to rotatably pivot between the first and second operating configurations.

The drive stud 158 includes a distal end 160 and a proximal end 162. The distal end 160 of the drive stud 158 includes a flat, rectangular shaped head and the proximal end 162 of the drive stud 158 includes a generally square shaped head. It will be appreciated that the drive stud 158 may be configured with other geometries as desired to function with various types of electrical components.

In the depicted example, the first end 146 of the switch link 136 is pivotally coupled with the drive stud 158. The distal end 160 of the drive stud 158 is configured to be received within an opening 164 defined in the switch link 136 at the first end 146 thereof such that the drive stud 158 is pivotally connected to the switch link 136. The proximal end 162 of the drive stud 158 is arranged and configured to be engaged with the rotating switch device 106 of the rotary disconnect 36 to pivotally couple the drive stud 158 with the rotary disconnect 36.

A drive stud stopper 166 (see FIG. 5) may be positioned on a plate 100 of the rotary disconnect 36 adjacent the electrical component 36 to prevent the drive stud 158 from being disengaged from the rotating switch device 106. The drive stud stopper 166 can help to ensure proper and consistent operations of the rotary disconnect 36. A spacer 168 is positioned between the disconnect link 136 and the drive stud stopper 166 to maintain a tight fit therebetween.

In use, the control handle 26 and the example rotation-increasing mechanical link arrangement 130 are connected to the elongate shaft 108 such that they all maintain relative motion to one another. The lever arm 112 of the control handle 26 can be rotated between a first rotational position and a second rotational position. Typically, the first rotational position is an "on-position" and the second rotational position is an "off-position," although alternatives are possible.

The lever arm 112 of the control handle 26 rotates between the first and second rotational positions about the second arc of rotational motion. Typically, the second arc of rotational motion travels at least 20°. Often, the first angle of motion travels no more than 60°. Usually, the second arc of rotational motion is within a range of 10° to 50°, although alternatives are possible. The amount of rotation of the control handle 26 allows the control handle 26 to be externally mounted close to the body 14 without interfering with the clamp device 22 positioned adjacent to the control handle 26.

Typically, the first arc of rotational motion is within a range of 10 degrees to 80 degrees, although alternatives are possible. Usually, the first arc of rotational motion is at least 60 degrees. Often, the first arc of rotational motion is no more than approximately 90 degrees. It will be appreciated that any number of angles may be used.

In certain examples, the rotation-increasing mechanical link arrangement 130 of the explosion-proof enclosure 10 may pivot about a first rotational axis 131 (see FIG. 10) between the first and second rotational positions.

As used herein, the term, "an offset end axis link arrangement," means that a first rotational axis at one end is offset or non-co-linear with a second rotational axis at the other end. The rotating switch device 106 can pivot about a second rotational axis 133 (see FIG. 10) between the first and second operating configurations. The first rotational axis is offset from the second rotational axis.

The present disclosure also relates to an example method of operating the electrical component 36 within the explosion-proof enclosure 10. The electrical component 36 includes a rotatable switch device 106. The method includes a step of 1) rotating a control handle 26 external of the explosion-proof enclosure 10 through a first arc of rotational motion while causing rotation of the rotatable switch device 106 through a second arc of rotational motion; the first arc of rotational motion being smaller than the second arc of rotational motion.

From the forgoing detailed description, it will be evident that modifications and variations can be made without departing from the spirit and scope of the disclosure.

Figure 11:
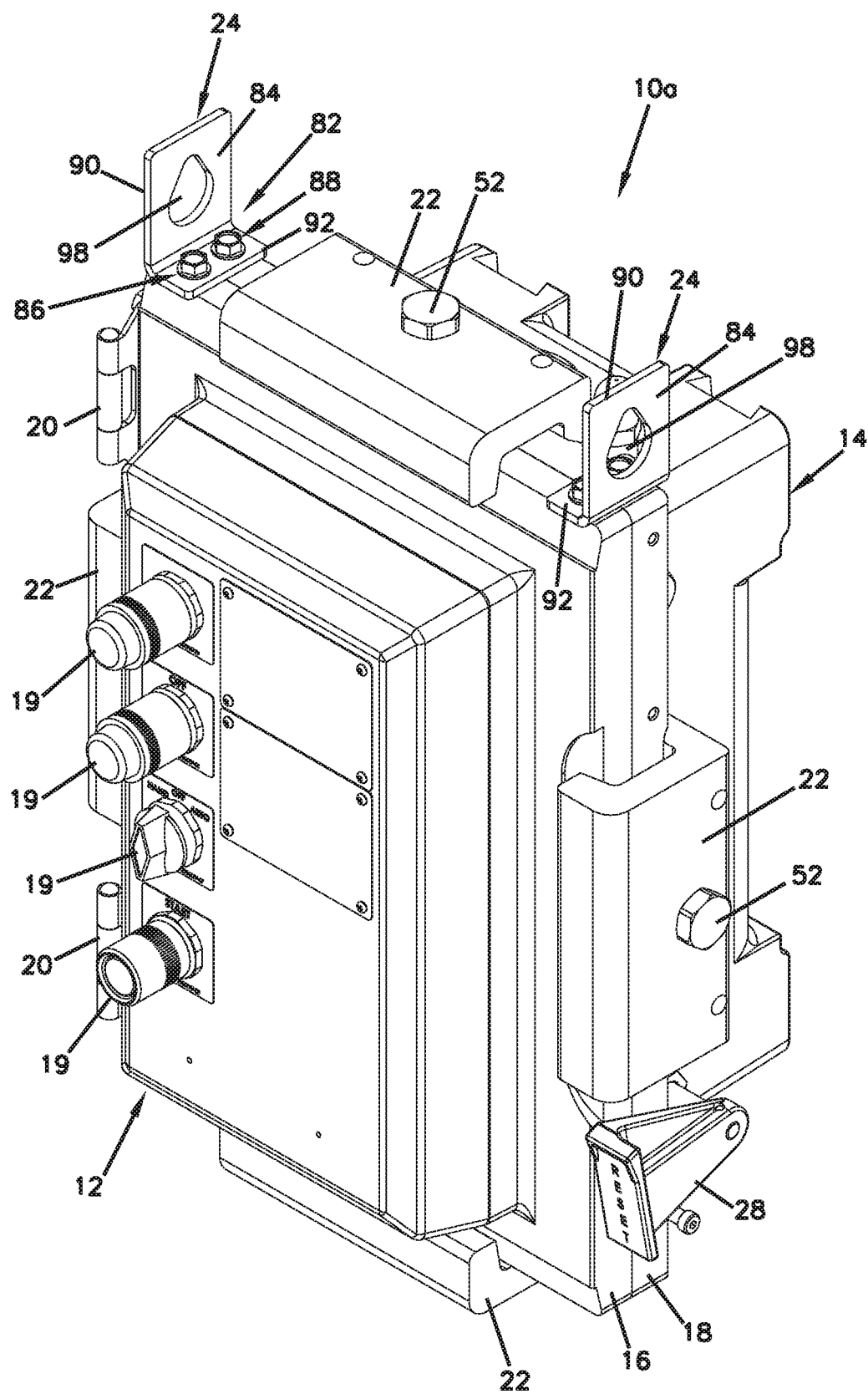
FIG. 11 is a schematic perspective view of a second example enclosure showing a reset controller in accord with the principles of the present disclosure.
Figure 12:
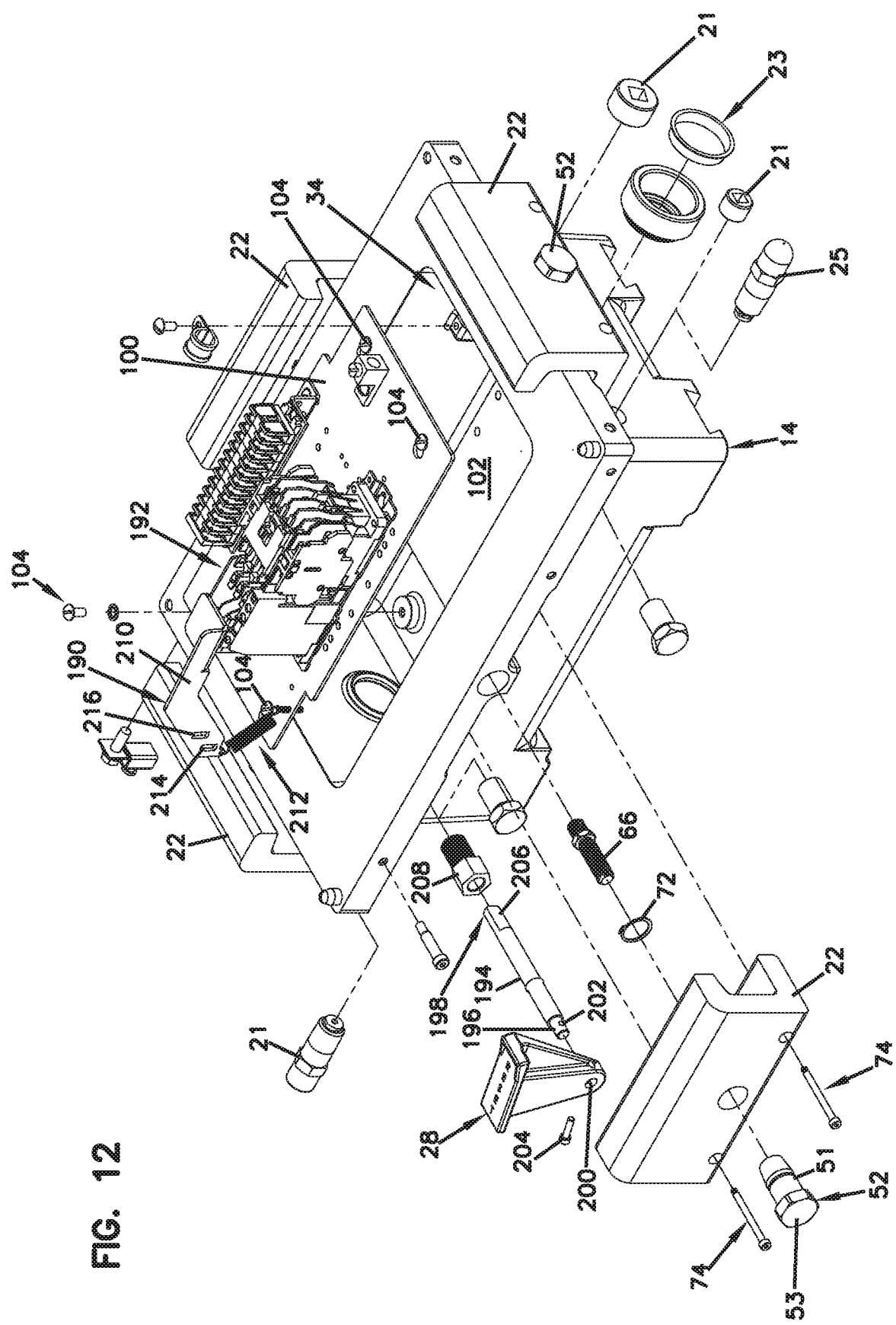
FIG. 12 is a schematic view of a body of the enclosure of FIG. 11 showing exploded views selected features of a clamp device and the reset controller of the enclosure in accord with the principles of the present disclosure.
Figure 13:
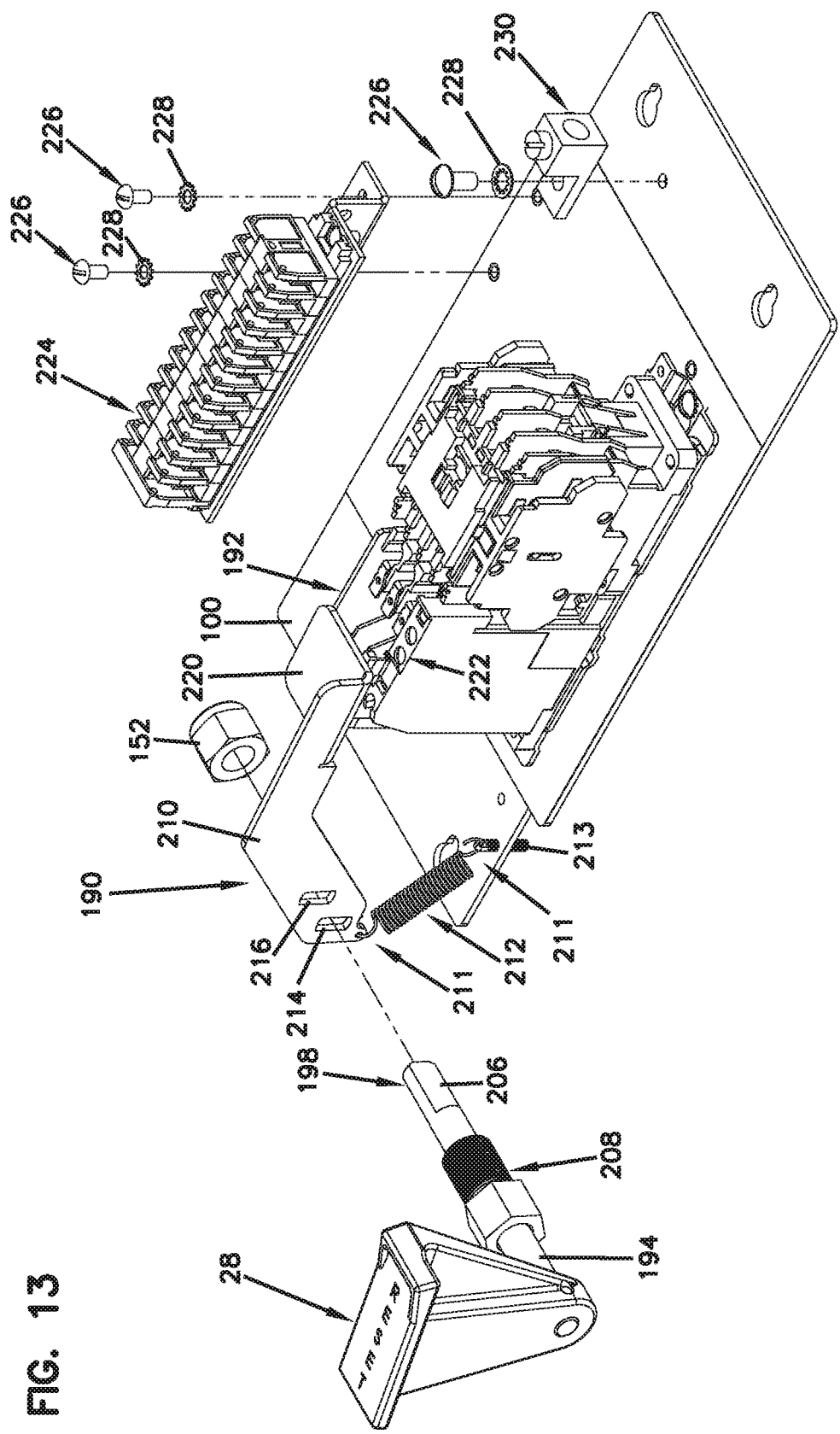
FIG. 13 is a schematic exploded view of the reset controller shown in FIG. 12 in conjunction with an active electrical component in accord with the principles of the present disclosure.

VI. Reset Controller Externally Positioned On An Enclosure; FIGS. 11-13

In certain example conventional explosion-proof enclosures, a reset switch for an electrical component positioned within the explosion-proof enclosure is a toggle switch. A toggle switch is a switch that uses a toggle joint with a spring to open or close an electric circuit as an attached lever is pushed through a small arc. Bail type link mechanisms have been used to transfer motion of a reset button externally to movement of the toggle switch.

Other types of equipment have reset switches that are vertically pressed to cause the reset of the active electrical component. Bail type link mechanisms that have been used with toggle switches would not work with such arrangements.

Improvements in operating reset buttons inside an enclosure are desired.

Referring to FIG. 11, a second embodiment of an explosion-proof enclosure 10a is depicted. The second embodiment of the explosion-proof enclosure 10a is embodied with similar design or structure as the first embodiment of the explosion-proof enclosure 10 shown in FIGS. 1-4. Thus, for the sake of brevity, only those portions of this embodiment that differ from the illustrated embodiment in FIGS. 1-4 discussed above will be described in detail.

The explosion-proof enclosure 10a includes the cover 12 and the body 14. The body 14 defines the chamber 34 for receiving circuit breakers, motor starters, switches, relays, terminals and meters, for example. An active electrical component 36 can be mounted within the chamber 34 of the body 14. In the example depicted, a motor starter 192 is shown mounted therein. It will be appreciated that other active electrical components may be used. The motor starter 192 has a non-toggle, linearly actuated, switch button 222 configured to move linearly between a first configuration and a second configuration. A non-toggle, linearly actuated, switch button defined as being a non-pivotal lever that is pivotable between two or more positions. In the examples described hereinafter, the non-toggle, linearly actuated, switch button is described as a non-toggle, linearly actuated, reset button 222 configured to move linearly between a reset configuration and a non-reset configuration. It will be appreciated that the non-toggle, linearly actuated, switch button can be a button used for other purposes. For example, a non-toggle, linearly actuated, switch button can be used for operations, such as, "on" and "off" configurations, alternatives are possible.

The example explosion-proof enclosure 10a includes a rotationally operated switch actuator arrangement mounted externally to the body 14 of the explosion-proof enclosure 10a. In the examples described hereinafter, the rotationally operated switch actuator arrangement is described as a rotationally operated reset actuator arrangement 28, although alternatives are possible. For example, the rotationally operated switch actuator arrangement can be an arrangement used for other purposes, such as, operating "on" and "off" switches, although alternatives are possible. The rotationally operated reset actuator arrangement 28 can be configured, upon actuation, to move about an arc of rotational motion between a first rotational position and a second rotational position. The first rotational position causes the non-toggle, linearly actuated, reset button 222 to be in the reset configuration, and the second rotational position causes the non-toggle, linearly actuated, reset button 222 to be in the non-reset configuration.

The example explosion-proof enclosure 10a further includes a rotation-to-linear motion mechanical link arrangement 190 positioned within the chamber 34 of the body 14 adjacent the electrical component 36 or motor starter 192. The rotation-to-linear motion mechanical link arrangement 190 is arranged and configured to transfer rotational motion from the rotationally operated reset actuator arrangement 28 to linear motion of the non-toggle, linearly actuated, reset button 222. It will be appreciated that the rotation-to-linear motion mechanical link arrangement 190 can be generally used with a linear switch, of which a reset button is a type, but can be used with alternate switches and with various active electrical components.

The rotationally operated reset actuator arrangement 28 can be mechanically coupled to an elongate shaft arrangement 194 such that the elongate shaft arrangement 194 is rotated through the arc of rotational motion as does the rotationally operated reset actuator arrangement 28.

In the depicted example, the a rotation-to-linear motion mechanical link arrangement 190 includes an internal biasing member 210 mounted on the elongate shaft arrangement 194 to pivot linearly as the elongate shaft arrangement 194 and the rotationally operated reset actuator arrangement 28 are moved rotationally about the arc of rotational motion.

The internal biasing member 210 further includes a contact member 220 configured to press the non-toggle, linearly actuated, reset button 222 to reset the configuration when the rotationally operated reset actuator arrangement 28 is in the first rotational position. The contact member 220 can be sized to have various dimensions to provide flexibility for covering different sized reset buttons or different locations of reset buttons within the chamber 34 of the explosion-proof enclosure 10a.

The example explosion-proof enclosure 10a may include a spring bias actuator reset-to-non-reset return arrangement. An example spring bias actuator reset-to-non-reset return arrangement is a spring bias member 212, although alternatives are possible. In use, once the rotationally operated reset actuator arrangement 28 is released to the first rotational position, the non-toggle, linearly actuated, reset button 222 is automatically returned to the non-reset configuration by spring action.

The rotationally operated reset actuator arrangement 28 can be mounted below the clamp devices 22, although alternatives are possible. The rotationally operated reset actuator arrangement 28 is connected to the inside of the explosion-proof enclosure 10a by rotation-to-linear motion mechanical link arrangement 190 in accordance with the present disclosure to overcome the drawbacks of a bail type mechanism. In one example, the rotation-to-linear motion mechanical link arrangement 190 extends through a wall of the body 14 and is positioned within the chamber 34 thereof.

Referring to FIGS. 12-13, an exploded view of the rotation-to-linear motion mechanical link arrangement 190 is shown. The rotation-to-linear motion mechanical link arrangement 190 includes the elongate shaft arrangement 194 having a first end 196 and a second end 198. The elongate shaft arrangement 194 extends through a side of the body 14 of the explosion-proof enclosure 10a into the chamber 34 thereof. The first end 196 of the elongate shaft arrangement 194 has a smaller diameter than the elongate shaft arrangement 194 and is configured to engage an opening 200 defined in the rotationally operated reset actuator arrangement 28. Thus, the rotationally operated reset actuator arrangement 28 can be connected to the elongate shaft arrangement 194. The first end 196 defines an aperture 202 therethrough that is adapted to receive a fastener 204 (e.g., pin, bolt, screw or the like) to secure the rotationally operated reset actuator arrangement 28 to the elongate shaft arrangement 194.

The second end 198 of the elongate shaft arrangement 194 includes a notch 206 providing the second end 198 with a generally rectangular shaped end, although alternatives are possible. A threaded bushing 208 is mounted over the elongate shaft arrangement 194 and threads into the side of the body 14 of the explosion-proof enclosure 10a. The threaded bushing 208 is fixed in the body 14 thereby allowing the elongate shaft arrangement 194 to pivot thereabout.

The spring bias member 212 is positioned between internal biasing member 210 and the plate 100 by connection points 211. In other examples, the spring bias member 212 can be positioned between the internal biasing member 210 and some other adjacent connection such as, but not limited to, a bracket, spring anchor, etc. The spring bias member 212 is secured to the plate 100 by a fastener 213. The fastener 213 can be a threaded bolt, although alternatives are possible.

The internal biasing member 210 depicted includes apertures 214, 216 for receiving the second end 198 of the elongate shaft 194. The apertures 214, 216 of the internal biasing member 210 have generally rectangular shaped openings that correspond with the generally rectangular shape of the second end 198 of the elongate shaft arrangement 194. A fastener 152 is positioned on the elongate shaft arrangement 194 to secure the rotation-to-linear motion mechanical link arrangement 190 thereon inside the chamber 34 of the body 14. The elongate shaft arrangement 194 can be received in either aperture 214, 216 as desired for controlling various active electrical components positioned inside the explosion-proof enclosure 10a. Thus, the rotation-to-linear motion mechanical link arrangement 190 has operating flexibility to function with various components inside the explosion-proof enclosure 10a.

The present disclosure also relates to a method of operating an active electrical component within an explosion-proof enclosure arrangement. The active electrical component can include the non-toggle, linearly actuated, reset button 222. The method includes a step of 1) rotating the rotationally operated reset actuator arrangement 28 external of the explosion-proof enclosure 10a about an arc of rotational motion between a first rotational position and a second rotational position while allowing linear actuation of the non-toggle, linearly actuated, reset button 222 to a reset configuration. The step of rotating the rotating a rotationally reset actuator arrangement 28 to the first rotational position allows the non-toggle, linearly actuated, reset button 222 to be in the reset configuration. The step of rotating the reset actuator arrangement 28 to the second rotational position allows the non-toggle, linearly actuated, reset button 222 to be in a non-reset configuration.

In the depicted example, a block terminal 224 is shown mounted on the plate 100 adjacent the starter 192 by fasteners 226 (screw, bolt, etc.) that include washers 228. The terminal block can be made of a thermoplastic material and manufactured by an injection molding process. A typical use for a terminal block is between a programmable controller and the equipment to be controlled. Another use is with ground fault equipment. The number of studs required in the block may vary widely depending upon the application. For example, some applications require a terminal block with as many as twenty separate termination points. A lug wire block 230 is also mounted to the plate 100 by fasteners 226.

From the forgoing detailed description, it will be evident that modifications and variations can be made without departing from the spirit and scope of the disclosure.

Figure 14:
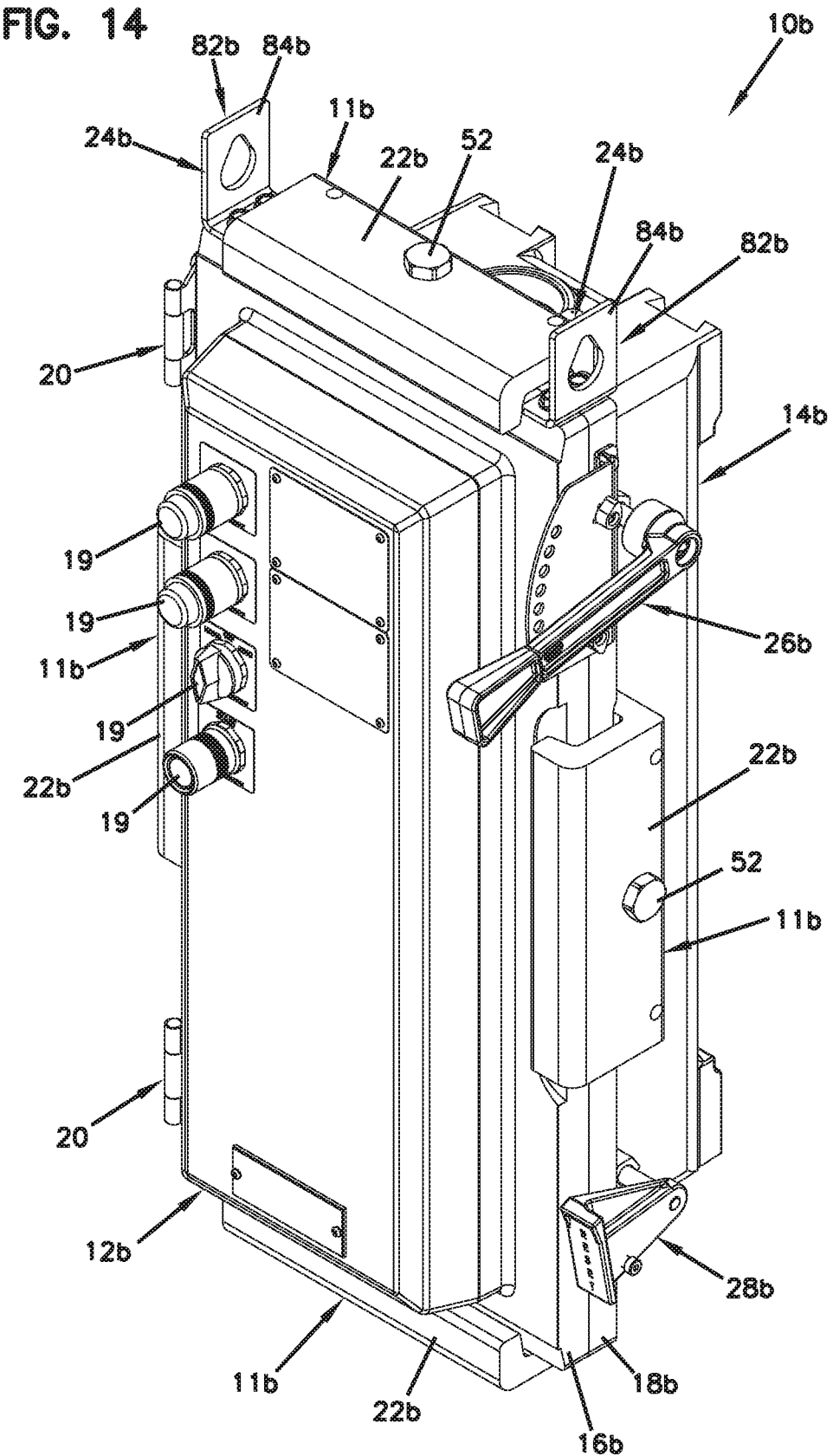
FIG. 14 is a schematic perspective view of a third example enclosure showing a reset controller and a control handle in accord with the principles of the present disclosure.
Figure 15:
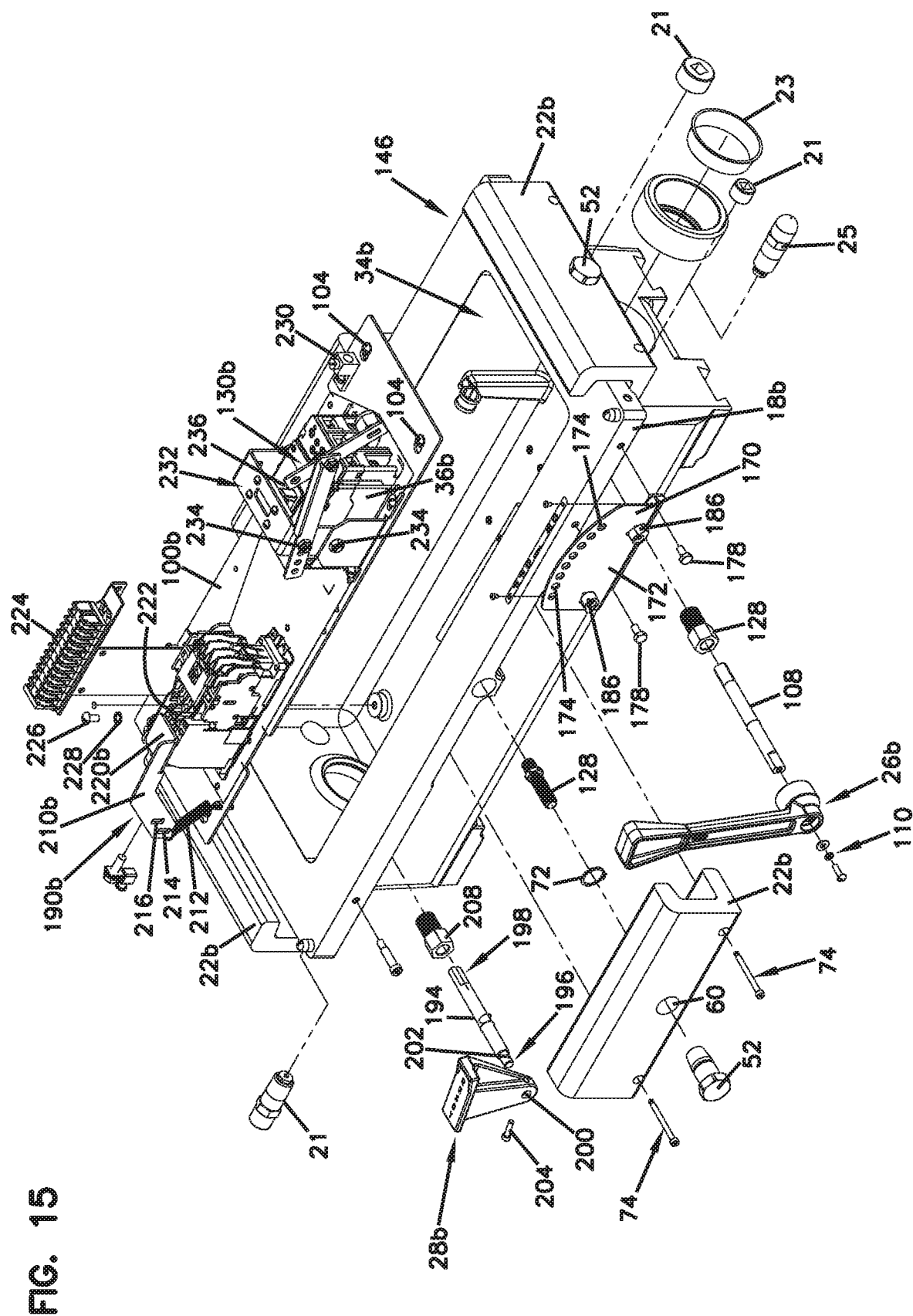
FIG. 15 is a schematic view of a body of the enclosure shown in FIG. 14 showing exploded schematic views of selected components of the enclosure.
Figure 16:
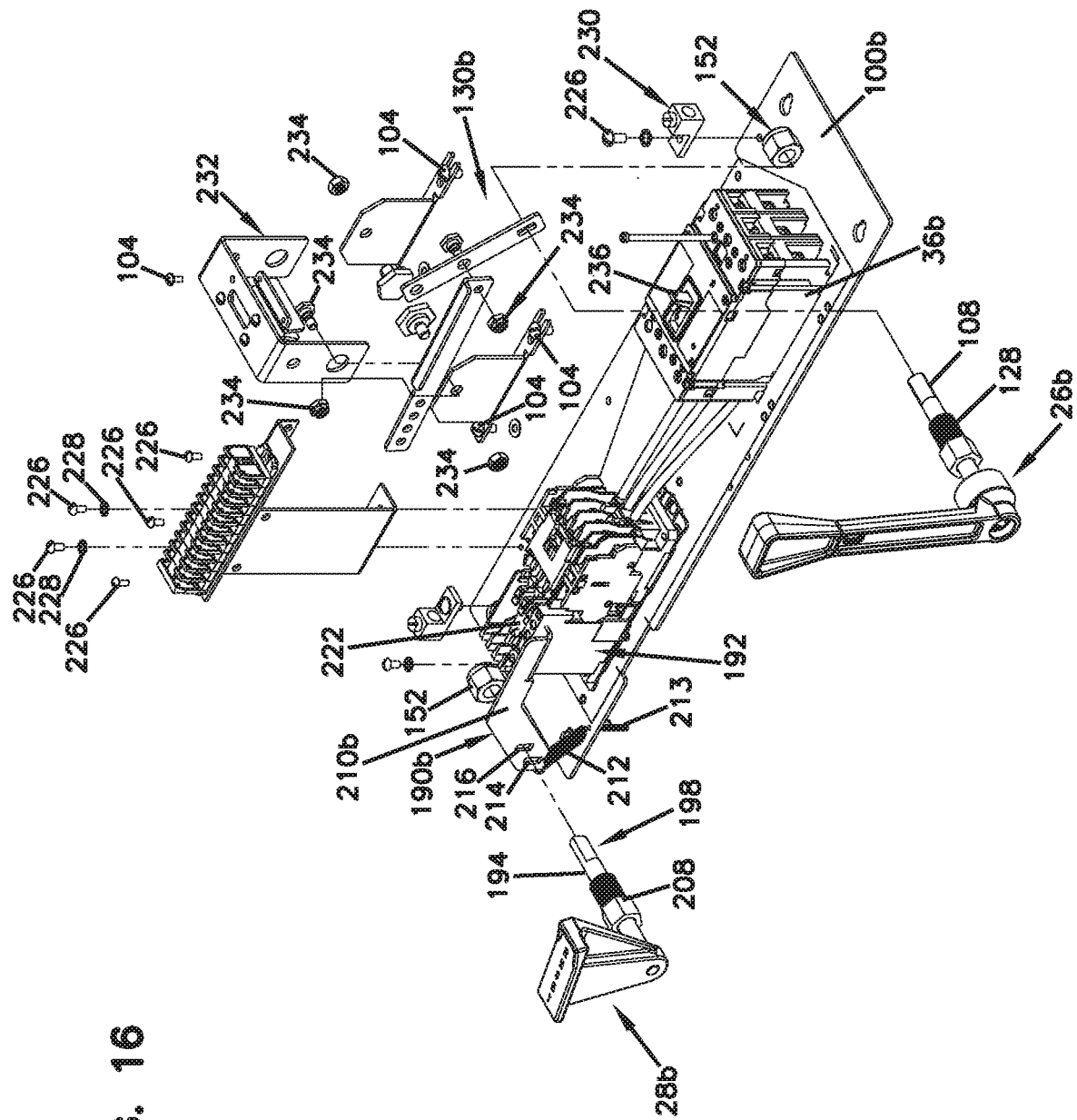
FIG. 16 is a schematic exploded view of the components of FIG. 15 without the body of the enclosure.

VII. Alternate Enclosure; FIGS. 14-16

Referring to FIGS. 14-16, an alternate example explosion-proof enclosure 10b is depicted. The explosion-proof enclosure 10b indicates how the features of the control handle 26b of the previously described example explosion-proof enclosure 10 can be used on an assembly that also includes a rotationally operated reset actuator arrangement 28b of the previously described example explosion-proof enclosure 10. Like reference numerals are used to indicate parts analogous to those described previously.

The example explosion-proof enclosure 10b includes a clamp arrangement 11 having a number of clamps or clamp devices 22 (e.g., clamp members) arranged around a perimeter of a cover 12 and a body 14 of the explosion-proof enclosure 10b. Features of the clamp devices 22 are analogous to the previous described features and like numerals are used to indicate analogous parts.

The example explosion-proof enclosure 10b includes one or more hinges 20 for hingedly coupling the cover 12b to the body 14b. The cover 12b includes a cover flange 16b positioned around a perimeter of the cover 12b. The cover 12b is mated to (i.e., abuts against) a body flange 18b positioned around a perimeter of the body 14b. Features of the cover 12b and cover perimeter flange 12b and the body 14b and body perimeter flange 18b are analogous to the previous described features and like numerals are used to indicate analogous parts.

The depicted explosion-proof enclosure 10b includes a control handle 26b mounted externally thereon. The control handle 26b is configured to move externally to the explosion-proof enclosure 10b to control an active electrical component 36b positioned within the chamber 34 of the body 14b. The control handle 26b can be rotated between a first rotational position and a second rotational position about an elongate shaft 108. It will be appreciated that a visual indicator (not shown) may be mounted on the control handle 26b. Features of the control handle 26b and the visual indicator are analogous to the previous described features and like numerals are used to indicate analogous parts.

The example explosion-proof enclosure 10b may include an enclosure handling assist arrangement 24b. The handling assists arrangement 24b includes a hanger and fastening arrangement 82b. Features of the handling assists arrangement 24b are analogous to the previous described features and like numerals are used to indicate analogous parts.

The example explosion-proof enclosure 10b may include an example rotation-increasing mechanical link arrangement 130b (i.e., an offset end axis link arrangement) arranged and configured to connect with the control handle 26b to rotate a rotating switch device 106 of an active electrical component 36b located inside the chamber 34 of the body 14b. Features of the rotation-increasing mechanical link arrangement 130b is analogous to the previous described features and like numerals are used to indicate analogous parts.

The example explosion-proof enclosure 10b may include an active electrical component mounted therein having a non-toggle, linearly actuated, reset button 222 configured to move linearly between a reset configuration and a non-reset configuration. A rotationally operated reset actuator arrangement 28b can be mounted externally on the explosion-proof enclosure 10b. Features of the non-toggle, linearly actuated, reset button 222 and the rotationally operated reset actuator arrangement 28b are analogous to the previous described features and like numerals are used to indicate analogous parts.

In the depicted example, a terminal block 224 is shown mounted on the plate 100b by fasteners 226 (screw, bolt, etc.) that include washers 228. The terminal block 224 can be made of a thermoplastic material and manufactured by an injection molding process. A typical use for a terminal block is between a programmable controller and the equipment to be controlled. Another use is with ground fault equipment. The number of studs required in the block may vary widely depending upon the application. For example, some applications require a terminal block with as many as twenty separate termination points. A lug wire block 230 is also shown mounted to the plate 100b by fasteners 226.

From the forgoing detailed description, it will be evident that modifications and variations can be made without departing from the spirit and scope of the disclosure.

VIII. Some General Observations

Aspects and techniques of the present disclosure relate to enclosures generally, but are particularly well adapted for explosion-proof enclosures. It will be appreciated that the aspects and techniques of the present disclosure can be applied in other applications.

The present disclosure relates to various concepts that can each be related together. The advantageous enclosure clamp arrangement can be practiced with one or more of the following: a visual indicator, an enclosure handling assist arrangement; a control handle; and a reset controller, or it can be practiced separately as desired.

The advantageous visual indicator can be practiced with one or more of the following: an enclosure clamp arrangement, an enclosure handling assist arrangement; a control handle; and a reset controller, or it can be practiced separately as desired.

The advantageous enclosure handling assist arrangement can be practiced with one or more of the following: an enclosure clamp arrangement; a visual indicator, a control handle; and a reset controller, or it can be practiced separately as desired.

The advantageous control handle can be practiced with one or more of the following: an enclosure clamp arrangement, a visual indicator, an enclosure handling assist arrangement; and a reset controller, or it can be practiced separately as desired.

The advantageous reset controller can be practiced with one or more of the following: an enclosure clamp arrangement; an enclosure handling assist arrangement; a visual indicator, and a control handle or, it can be practiced separately as desired.

Herein in the context of characterization of claims that follow in the section titled "What Is Claimed Is," the phrase "in accord with at least one of" means that any selected one of the claims can be used and it is not necessary that all of the details of all the claims must be used.

What is claimed is:

1. An enclosure arrangement comprising:
   (a) an enclosure having a cover and a body, the body defining a cavity;
   (b) an electrical component mounted within the cavity of the body, the electrical component having a rotating switch device configured to move about a first arc axis of rotational motion between a first operating configuration and a second operating configuration, the first operating configuration being a power-on configuration and the second operating configuration being a power-off configuration; and
   (c) a control handle mounted externally to the body of the enclosure, the control handle being configured to move about a second arc axis of rotational motion between a first rotational position and a second rotational position, the first rotational position being an on-position causing the rotating switch device to be in the power-on configuration, and the second rotational position being an off-position causing the rotating switch device to be in the power-off configuration;
   (d) wherein the first arc axis of rotational motion is offset from the second arc axis of rotational motion.

2. The enclosure arrangement according to claim 1, wherein:
   (a) the enclosure is an electrical enclosure that encloses operating electrical equipment.

3. The enclosure arrangement according to claim 1, wherein:
   (a) the first arc axis of rotational motion is greater than the second arc axis of rotational motion.

4. The enclosure arrangement according to claim 1, wherein:
   (a) the first arc axis of rotational motion is less than the second arc axis of rotational motion.

5. The enclosure arrangement according to claim 1, wherein:
   (a) the second arc axis of rotational motion moves through an angle of no more than 60 degrees.

6. The enclosure arrangement according to claim 1, wherein:
   (a) the second arc axis of rotational motion moves through an angle of no more than 50 degrees.

7. The enclosure arrangement according to claim 1, wherein:
   (a) the first arc axis of rotational motion moves through an angle of at least 90 degrees.

8. The enclosure arrangement according to claim 1, wherein:
   (a) the second arc axis of rotational motion is no more than 60 percent of the first arc axis of rotational motion.

9. The enclosure arrangement according to claim 1, wherein:
   (a) the control handle is mounted on a side of the body, the control handle being mechanically coupled to an elongate shaft arrangement such that the elongate shaft arrangement is rotated through the second arc axis of rotational motion as does the control handle.

10. The enclosure arrangement according to claim 1, further comprising:
    (a) a rotation-increasing mechanical link arrangement positioned within the cavity of the body adjacent the electrical component, the rotation-increasing mechanical link arrangement being connected to the control handle and the rotating switch device to translate angular motion externally about the second arc axis of rotational motion to internally about the first arc axis of rotational motion.

11. The enclosure arrangement according to claim 10, wherein:
    (a) the rotation-increasing mechanical link arrangement includes:
       (i) a handle link mounted on the elongate shaft arrangement to rotate through the second arc axis of rotational motion as does the elongate shaft arrangement and the control handle as the control handle is moved;
       (ii) a switch link mounted on the rotating switch device to rotate through the first arc axis of rotational motion to move the rotating switch device between the first and second operating configurations upon rotation of the control handle; and
       (iii) a translation link positioned between the handle link and the switch link.

12. The enclosure arrangement according to claim 10, further comprising:
(a) a drive stud pivotally attached to the rotation-increasing mechanical link arrangement, the drive stud being engaged with the rotating switch device to rotatably pivot between the first and second operating configurations.

13. The enclosure arrangement according to claim 1, further comprising:
(a) a lockout plate comprising a plurality of apertures to selectively lock the control handle as desired.

14. An enclosure arrangement comprising:
(a) an enclosure having a cover and a body, the body defining a cavity;
(b) an off-set end axis link arrangement mounted externally to a side of the body of the enclosure to pivot about a first rotational axis between a first rotational position and a second rotational position; and
(c) an electrical component mounted within the cavity of the body, the electrical component having a rotating switch device that pivots about a second rotational axis between a first operating configuration and a second operating configuration, the first operating configuration being a power-on configuration and the second operating configuration being a power-off configuration; and
(i) the first rotational axis being offset from the second rotational axis.

15. The enclosure arrangement according to claim 14, wherein:
(a) the rotating switch device is configured to move about a first arc of rotational motion between the first and second operating configurations; and
(b) the off-set end axis link arrangement is configured to move about a second arc of rotational motion between the first and second rotational positions, the first rotational position being an on-position causing the rotating switch device to be in the power-on configuration, and the second rotational position being an off-position causing the rotating switch device to be in the power-off configuration;
(i) the first arc of rotational motion being greater than the second arc of rotational motion.

16. A control device for an enclosure arrangement, the enclosure arrangement including a cover and a body, the body defining a cavity for receiving an active electrical component, the active electrical component having a rotating switch device, the control device comprising:
(e) a control handle, in use, mountable externally to a side of the body of the enclosure arrangement, the control handle being configured, in use, to pivot about a first rotational axis while allowing the rotating switch device to pivot about a second rotational axis;
(i) the first rotational axis being offset from the second rotational axis.

17. The control device according to claim 16, wherein:
(a) the enclosure arrangement is an electrical enclosure arrangement that encloses operating electrical equipment.

18. The control device according to claim 16, wherein:
(a) the enclosure arrangement is an explosion-proof enclosure arrangement.

19. The control device according to claim 16, further comprising:
(a) an offset end axis link arrangement positioned within the cavity of the body adjacent the electrical component, the offset end axis link arrangement being connected to the control handle and the rotating switch device to pivot the control handle about the first rotational axis; and to pivot the rotating switch device about the second rotational axis.

20. The control device according to claim 16, further comprising:
(a) a rotation-increasing mechanical link arrangement being configured, in use, to move the control handle through a first arc of rotational motion while causing rotation of the rotating switch device through a second arc of rotational motion;
(i) the first arc of rotational motion being smaller than the second arc of rotational motion.

* * * * *